US011878240B2

United States Patent
Yang et al.

(10) Patent No.: US 11,878,240 B2
(45) Date of Patent: Jan. 23, 2024

(54) METHOD, APPARATUS, DEVICE, AND STORAGE MEDIUM FOR PERSPECTIVE ROTATION

(71) Applicant: Tencent Technology (Shenzhen) Company Limited, Shenzhen (CN)

(72) Inventors: Jin Yang, Shenzhen (CN); Jiaqi Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 371 days.

(21) Appl. No.: 17/337,279

(22) Filed: Jun. 2, 2021

(65) Prior Publication Data
US 2021/0291053 A1 Sep. 23, 2021

Related U.S. Application Data

(63) Continuation of application No. PCT/CN2020/100873, filed on Jul. 8, 2020.

(30) Foreign Application Priority Data

Jul. 26, 2019 (CN) .......................... 201910683976.6

(51) Int. Cl.
*A63F 13/5252* (2014.01)
*A63F 13/2145* (2014.01)
(Continued)

(52) U.S. Cl.
CPC ...... *A63F 13/5252* (2014.09); *A63F 13/2145* (2014.09); *G06F 3/04815* (2013.01);
(Continued)

(58) Field of Classification Search
CPC .............. A63F 13/5252; A63F 13/2145; A63F 2300/6669; A63F 2300/6676; A63F 2300/8082; G06F 3/04847; G06F 3/04845
See application file for complete search history.

(56) References Cited

U.S. PATENT DOCUMENTS 9,007,379 B1 * 4/2015 Shafer ..................... G06T 11/40
345/473
2007/0270215 A1 * 11/2007 Miyamoto ............ A63F 13/525
463/32
(Continued)

FOREIGN PATENT DOCUMENTS

CN 105760076 A 7/2016
CN 107694087 A 2/2018
(Continued)

OTHER PUBLICATIONS

Tencent Technology, Vietnamese Office Action, VN Patent Application No. 1-2021-06486, dated Jul. 25, 2023, 4 pgs.
(Continued)

*Primary Examiner* — Steve Rowland
(74) *Attorney, Agent, or Firm* — Morgan, Lewis & Bockius LLP

(57) ABSTRACT

This application discloses a method for perspective rotation in a virtual environment performed at a terminal. The method includes: displaying a first perspective image of an application program associated with the virtual environment, a first function control and a second function control being overlaid on the first perspective image; receiving a first perspective rotation operation triggered based on the first function control; enabling a first function and a perspective rotation function of the first function control, and switching the first perspective image to a second perspective image; receiving a second perspective rotation operation triggered based on the second function control while the first
(Continued)

function control is in an enabled state; and disabling the perspective rotation function of the first function control, enabling a second function and a perspective rotation function of the second function control, and switching the second perspective image to a third perspective image.

20 Claims, 12 Drawing Sheets

(51) Int. Cl.
    *G06F 3/04815* (2022.01)
    *G06F 3/04847* (2022.01)
(52) U.S. Cl.
    CPC .. *G06F 3/04847* (2013.01); *A63F 2300/6669* (2013.01); *A63F 2300/6676* (2013.01); *A63F 2300/8082* (2013.01)

(56) References Cited

U.S. PATENT DOCUMENTS

| | | | |
|---|---|---|---|
| 2008/0143722 A1* | 6/2008 | Pagan | A63F 13/45 345/427 |
| 2011/0244956 A1* | 10/2011 | Sakakibara | A63F 13/213 463/31 |
| 2014/0002581 A1 | 1/2014 | Bear et al. | |
| 2015/0157932 A1 | 6/2015 | Kwon et al. | |
| 2015/0182856 A1 | 7/2015 | Mays, III et al. | |
| 2017/0301135 A1* | 10/2017 | Jagnow | G06T 19/003 |
| 2017/0368460 A1 | 12/2017 | Ceraldi et al. | |
| 2018/0160049 A1* | 6/2018 | Aizawa | H04N 23/69 |
| 2019/0080495 A1* | 3/2019 | Andronikos | A63B 71/0622 |
| 2019/0325650 A1* | 10/2019 | Milz | H04N 23/54 |
| 2020/0293176 A1* | 9/2020 | Yoganandan | G06F 3/04815 |
| 2020/0322590 A1* | 10/2020 | Fattal | H04N 13/282 |
| 2020/0357163 A1* | 11/2020 | Wang | G06F 3/04815 |
| 2021/0117070 A1* | 4/2021 | Muta | A63F 13/422 |
| 2022/0109794 A1* | 4/2022 | Takahashi | H04N 23/61 |
| 2022/0261953 A1* | 8/2022 | Li | G06T 3/40 |

FOREIGN PATENT DOCUMENTS

| | | |
|---|---|---|
| CN | 108376424 A | 8/2018 |
| CN | 108499105 A | 9/2018 |
| CN | 108525294 A | 9/2018 |
| CN | 108553891 A | 9/2018 |
| CN | 108771863 A | 11/2018 |
| CN | 108815851 A | 11/2018 |
| CN | 109690633 A | 4/2019 |
| CN | 109821237 A | 5/2019 |
| CN | 110038297 A | 7/2019 |
| CN | 110393916 A | 11/2019 |
| JP | 2008532185 A | 8/2008 |
| JP | 2016073663 A | 5/2016 |
| JP | 2018060539 A | 4/2018 |
| JP | 2019058659 A | 4/2019 |
| JP | 2019076721 A | 5/2019 |
| KR | 20160126848 A | 11/2016 |

OTHER PUBLICATIONS

Extended European Search Report, EP20846755.5, dated Apr. 4, 2022, 11 pgs.
Tencent Technology, Singapore Office Action, SG Patent Application No. 11202110279U, dated Jan. 30, 2023, 9 pgs.
Tencent Technology, WO, PCT/CN2020/100873, dated Oct. 12, 2020, 4 pgs.
Tencent Technology, IPRP, PCT/CN2020/100873, Feb. 1, 2022, 5 pgs.
Tencent Technology, ISR, PCT/CN2020/100873, dated Oct. 10, 2020, 2 pgs.
Tencent Technology, Korean Office Action, KR Patent Application No. 10-2021-7034151, dated Aug. 18, 2023, 5 pgs.

* cited by examiner

METHOD, APPARATUS, DEVICE, AND STORAGE MEDIUM FOR PERSPECTIVE ROTATION

CROSS-REFERENCE TO RELATED APPLICATIONS

This application is a continuation application of PCT Patent Application No. PCT/CN2020/100873, entitled "VIEWING ANGLE ROTATION METHOD, DEVICE, APPARATUS, AND STORAGE MEDIUM" filed on Jul. 8, 2020, which claims priority to Chinese Patent Application No. 201910683976.6, filed with the State Intellectual Property Office of the People's Republic of China on Jul. 26, 2019, and entitled "METHOD, APPARATUS, DEVICE, AND STORAGE MEDIUM FOR PERSPECTIVE ROTATION", all of which are incorporated herein by reference in their entirety.

FIELD OF THE TECHNOLOGY

Embodiments of this application relate to the field of man-machine interaction, and in particular, to a perspective rotation technique.

BACKGROUND OF THE DISCLOSURE

On a mobile terminal such as a smart phone and a tablet PC, virtual environment based application programs exist, such as a First Person Shooting (FPS) game, a Third Person Shooting (TPS) game, and a Multiplayer Online Battle Arena (MOBA) game.

In the application programs, a user aims at the shooting target and observes the environment by controlling perspective rotation of a virtual character. Generally, a user interface of the application program is provided with a perspective rotation control; the user controls the perspective rotation of the virtual character through movement operations such as up, down, left, and right triggered on the perspective rotation control; moreover, in the process of controlling the perspective rotation, the perspective rotation operation of only one contact can be responded at the same time.

Under the condition that the perspective rotation operation of only one contact can be responded at the same time, once the unique contact disappears, switching a perspective again requires to re-trigger one contact, thus reducing the interaction efficiency in the operation process.

SUMMARY

Embodiments of this application provide a method, apparatus, device, and storage medium for perspective rotation, which can improve interaction efficiency in a perspective rotation process. The technical solutions are as follows:

According to an aspect of this application, provided is a method for perspective rotation in a virtual environment performed at a terminal, the method including:

displaying a first perspective image of an application program associated with the virtual environment, the first perspective image being an image of the virtual environment observed using a first perspective direction of a virtual character in the virtual environment, and a first function control for supporting a first function and a perspective rotation function and a second function control for supporting a second function and the perspective rotation function being overlaid on the first perspective image;

receiving a first perspective rotation operation triggered based on the first function control;

enabling the first function and the perspective rotation function of the first function control and switching the first perspective image to a second perspective image according to the first perspective rotation operation, the second perspective image being an image of the virtual environment observed using a second perspective direction of the virtual character in the virtual environment;

receiving a second perspective rotation operation triggered based on the second function control while the first function control is in an enabled state; and disabling the perspective rotation function of the first function control, enabling the second function and the perspective rotation function of the second function control, and switching the second perspective image to a third perspective image according to the second perspective rotation operation, the third perspective image being an image of the virtual environment observed using a third perspective direction of the virtual character in the virtual environment.

According to another aspect of this application, provided is an apparatus for perspective rotation in a virtual environment, including:

a display module, configured to display a first perspective image of an application program associated with the virtual environment, the first perspective image being an image of the virtual environment observed using a first perspective direction of a virtual character in the virtual environment, and a first function control for supporting a first function and a perspective rotation function and a second function control for supporting a second function and the perspective rotation function being further overlaid on the first perspective image;

a receiving module, configured to receive a first perspective rotation operation triggered based on the first function control;

a processing module, configured to enable the first function and the perspective rotation function of the first function control and switch the first perspective image to a second perspective image according to the first perspective rotation operation, the second perspective image being an image of the virtual environment observed using a second perspective direction of the virtual character in the virtual environment;

the receiving module, configured to receive a second perspective rotation operation triggered based on the second function control while the first function control is in an enabled state; and the processing module, configured to disable the perspective rotation function of the first function control, enable the second function and the perspective rotation function of the second function control, and switch the second perspective image to a third perspective image according to the second perspective rotation operation, the third perspective image being an image of the virtual environment observed using a third perspective direction of the virtual character in the virtual environment.

According to yet another aspect of this application, provided is a terminal, including:

a memory; and a processor connected to the memory;

the processor being configured to load and execute executable instructions to implement the method for perspective rotation in a virtual environment according to any one of the aspects above and optional embodiments thereof.

According to still another aspect of this application, provided is a non-transitory computer-readable storage medium having at least one instruction for perspective rotation in a virtual environment stored thereon; the at least one instruction being loaded and executed by a processor of a terminal to implement the method for perspective rotation according to any one of the aspects above and embodiments thereof.

According to yet another aspect of this application, provided is a computer program product, including instructions, when run on a computer, causing the computer to execute the method for perspective rotation in a virtual environment according to any one of the aspects above and optional embodiments thereof.

The technical solutions provided in the embodiments of this application achieve at least the following beneficial effects:

displaying, on a terminal, a first perspective image of an application program; a first function control for supporting a first function and a perspective rotation function and a second function control for supporting a second function and the perspective rotation function being overlaid on the first perspective image; receiving, by the terminal, a first perspective rotation operation triggered based on the first function control; enabling the first function and the perspective rotation function of the first function control and switching the first perspective image to a second perspective image according to the first perspective rotation operation; receiving a second perspective rotation operation triggered based on the second function control while the first function control is in an enabled state; and disabling the perspective rotation function of the first function control, enabling the second function and the perspective rotation function of the second function control, and switching the second perspective image to a third perspective image according to the second perspective rotation operation.

The method can further respond to the perspective rotation operation triggered based on the second function control while the perspective rotation function of the first function control is triggered, that is, a screen may respond to the perspective rotation operations of at least two contact points at the same time, improving the interaction efficiency in an operation process. Moreover, in this method, when the first function control is in the enabled state, based on the perspective rotation function triggered by the second function, the terminal first responds to the perspective rotation operation triggered based on the second function control, ensuring that a plurality of function controls having the perspective rotation function are all enabled, and ensuring the orderliness and accuracy of the response of the terminal to the perspective rotation operation.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
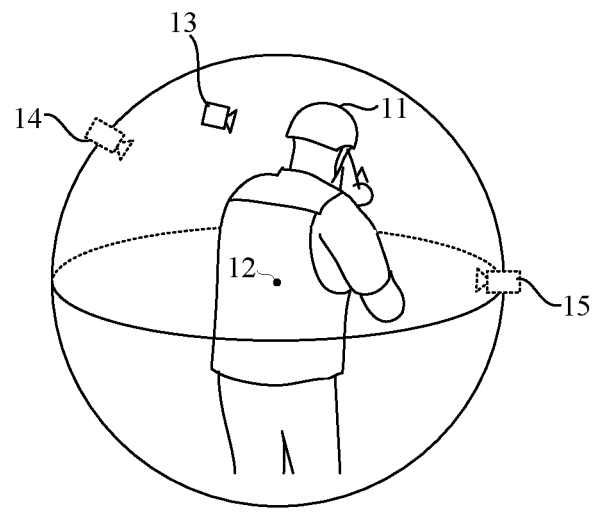
FIG. 1 is a schematic diagram of a camera model according to an exemplary embodiment of this application.

To make the objectives, technical solutions, and advantages of this application clearer, the following further describes implementations of this application in detail with reference to the accompanying drawings.

First, the following explains several terms involved in the embodiments of this application.

Virtual environment: a virtual environment displayed (or provided) when an application program runs on a terminal. The virtual environment may be a simulation environment of a real world, may also be a semi-simulation and semi-fiction environment, and may further be a pure fiction environment. The virtual environment may be any one of a 2D virtual environment, 2.5D virtual environment, and 3D virtual environment; for the virtual environment to be the 3D virtual environment is exemplified in the following embodiment, but it is not limited thereto.

Virtual character: a movable object in the virtual environment. The movable object may be at least one of a virtual figure, a virtual animal, and an animation and cartoon figure. In some embodiments, when the virtual environment is the 3D virtual environment, the virtual character is a 3D stereoscopic model created based on an animation skeleton technology. Each virtual character has its own shape and volume in the 3D virtual environment, and occupies a part of spaces in the 3D virtual environment.

Perspective direction: an observing direction of the virtual environment observed using a first person perspective, a third person perspective, or other perspectives of the virtual character. The other perspectives may be a look-down perspective or any other possible view angles; the first person perspective is an observing perspective of the virtual character of a first person in the virtual environment, and the observed virtual image does not include the virtual character itself; the third person perspective is an observing perspective of the virtual character of a third person in the virtual environment, and the observed virtual image includes the virtual character itself. In some embodiments, in the embodiments of this application, the perspective direction refers to a direction observed by the camera model when the virtual character is observing in the virtual environment.

In some embodiments, the camera model performs automatic following on the virtual character in the virtual environment, that is, when the position of the virtual character changes in the virtual environment, the camera model changes at the same time with the position of the virtual character in the virtual environment, and the camera model is always located in a preset distance range of the virtual character in the virtual environment. In some embodiments, in the automatic following process, a relative position between the camera model and the virtual character would not change.

Camera model: a 3D model located around the virtual character in the 3D virtual environment; in a case of adopting a first person perspective, the camera model is located around the head of the virtual character or located at the head of the virtual character; in a case of adopting a third person perspective, the camera model may be located behind the virtual character and bound to the virtual character, and may also be located at any position away from the virtual character by a preset distance, and the virtual character located in the 3D virtual environment can be observed from different angles by means of the camera model. In some embodiments, when the third person perspective is an over-shoulder perspective of the first person, the camera model is located behind the virtual character (e.g., the head and shoulder of the virtual character). In some embodiments, in addition to the first person perspective and the third person perspective, the perspective further includes other perspectives, for example, the look-down perspective; in a case of adopting the look-down perspective, the camera model may be located above the head of the virtual character, and the look-down perspective is a perspective for observing the virtual environment from an aerial look-down angle. In some embodiments, the camera model would not be actually displayed in the 3D virtual environment, that is, the camera model would not be displayed in the 3D virtual environment display at a user interface.

Taking the camera model to be located at any position away from the virtual character by a preset distance as an example for explanation, optionally, a virtual character corresponds to a camera model; the camera model may rotate about the virtual character, for example, the camera model rotates about any point of the virtual character; in the rotating process, the camera model not only rotates in angle, but also offsets in displacement; during rotating, the distance between the camera model and the rotating center remains unchanged, that is, the camera model is rotated on a sphere surface using the rotating center as a sphere center, where any point of the virtual character may be any point of the head and trunk of the virtual character or around the virtual character, which is not limited in the embodiments of this application. In some embodiments, when the camera model observes the virtual character, a center orientation of the perspective of the camera model points to a direction of a point of the sphere surface where the camera model is located pointing to the sphere center.

In some embodiments, the camera model may further observe the virtual character from different directions of the virtual character at a preset angle.

Exemplarily, with reference to FIG. 1, a point in a virtual character 11 is determined as a rotating center 12; the camera model rotates around the rotating center 12; optionally, the camera model is provided with an initial position; the initial position is a position behind and above the virtual character (for example, a rear position of the brain). Exemplarily, as shown in FIG. 1, the initial position is position 13; when the camera model rotates to position 14 or position 15, the perspective direction of the camera model changes as the rotation of the camera model.

The terminal in this application may be a laptop computer, a mobile phone, a tablet computer, an e-book reader, a video game console, a Moving Picture Experts Group Audio Layer IV (MP4) player, etc.

Figure 2:
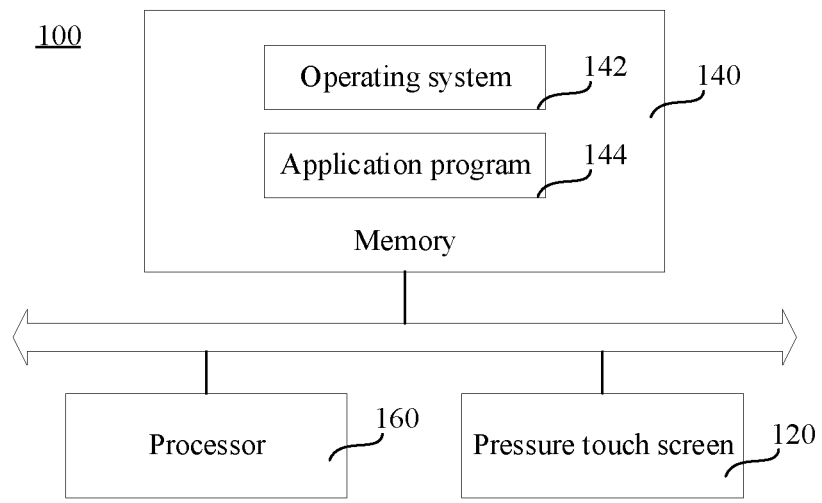
FIG. 2 is a structural block diagram of a terminal according to an exemplary embodiment of this application.

For a hardware structure, the terminal above includes a pressure touch screen 120, a memory 140, and a processor 160; refer to the structural block diagram of the terminal shown in FIG. 2.

The touch screen 120 may be a capacitive screen or a resistive screen. The touch screen 120 is configured to implement interactions between the terminal and the user. In the embodiments of this application, the terminal obtains the perspective rotation operation triggered by the user through the touch screen 120.

The memory 140 may include one or more computer-readable storage medium. The computer storage media include at least one of a Random Access Memory (RAM), a Read Only Memory (ROM), and a Flash. An operating system 142 and an application program 144 are installed in the memory 140.

The operating system 142 is basic software for providing a secure access to computer hardware for the application program 144. The operating system 142 may be an Android or IOS system.

The application program 144 is an application program supporting the virtual environment; the virtual environment includes the virtual character. In some embodiments, the application program 144 is an application program supporting a 3D virtual environment. The application program 144 may be any one of a virtual reality application program, a 3D map program, a military simulated program, a TPS game, an FPS game, a MOBA game, and a multi-player shootout survival game. In some embodiments, the application program 144 may be a stand-alone version application program, for example, a stand-alone version 3D game program, and may also be a network on-line version application program.

The processor 160 may include one or more processing cores, such as a 4-core processor and an 8-core processor. The processor 160 is configured to execute a perspective rotation command according to the perspective rotation operation of the virtual character received on the touch screen 120.

Figure 3:
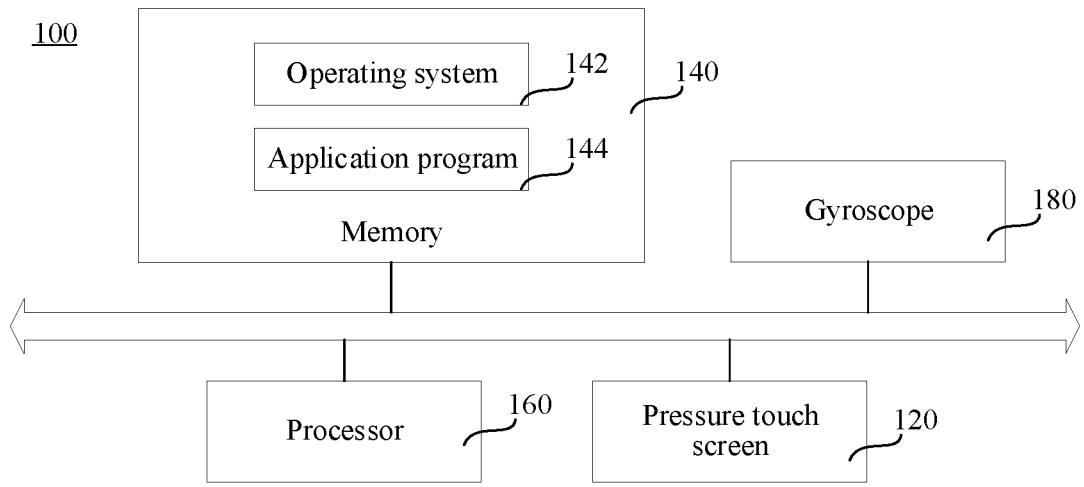
FIG. 3 is a structural block diagram of a terminal according to another exemplary embodiment of this application.

As shown in FIG. 3, in the embodiments of the present application, the terminal may further include a gyroscope 180. The gyroscope 180 is configured to obtain a perspective rotation operation of the virtual character triggered by the user.

Figure 4:
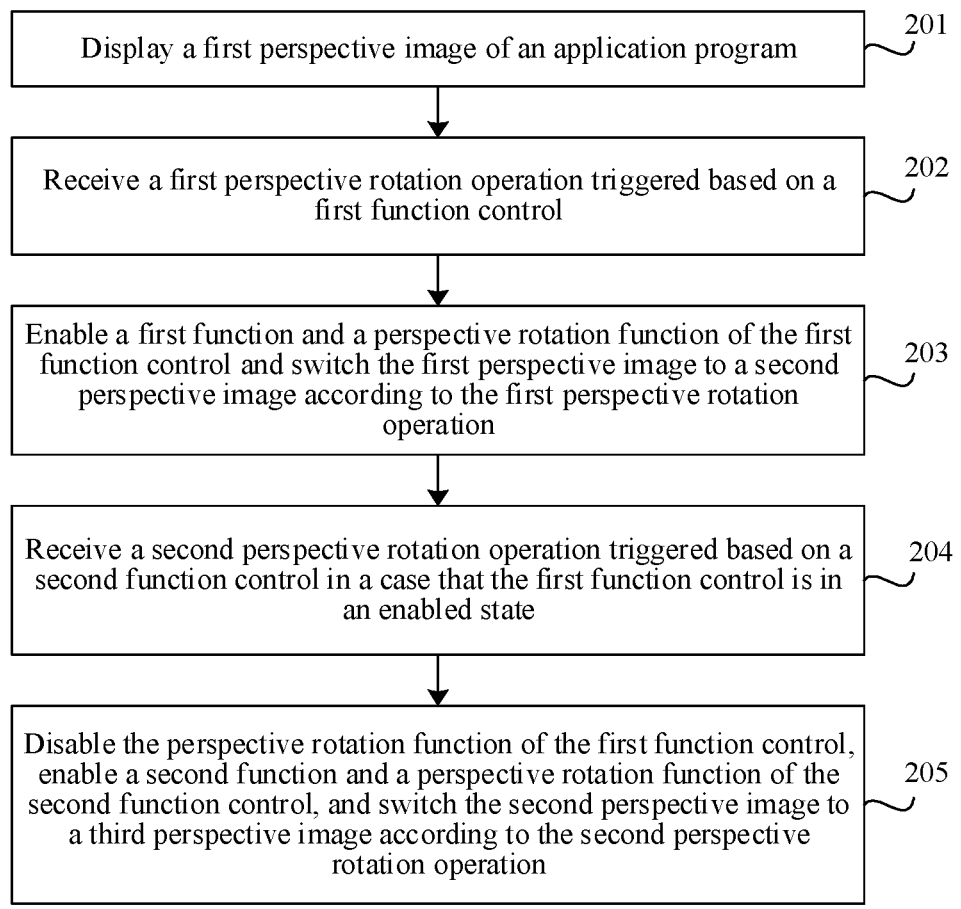
FIG. 4 is a flow chart of a method for perspective rotation according to an exemplary embodiment of this application.

FIG. 4 is a flow chart of a method for perspective rotation in a virtual environment according to an exemplary embodiment of this application. Explanation is conducted taking applying the method to the terminal shown in FIG. 2 or FIG. 3 as an example, the method includes the following steps:

Step 201: Display a first perspective image of an application program (e.g., a game) associated with the virtual environment.

A first perspective image of an application program is displayed on the terminal. In some embodiments, the application program may be at least one of a virtual reality application program, a 3D map application program, a military simulated program, a TPS game, an FPS game, and a MOBA game.

In some embodiments, the first perspective image is an image of the virtual environment observed using a first perspective direction of the virtual character in the virtual environment. The first perspective direction can be a direction of the virtual environment observed using at least one of the first person perspective, the third person perspective, or other perspectives. The other perspectives may be the look-down perspective or any other possible perspectives. The virtual environment image corresponding to the first person perspective does not include the virtual character itself; the virtual environment images correspond to the third person perspective and the look-down perspective include the virtual character itself; for example, of the virtual environment observed through the camera model, a 3D model of the virtual character, a virtual gun held by the virtual character and the like can be seen.

In some embodiments, a first function control for supporting a first function and a perspective rotation function and a second function control for supporting a second function and the perspective rotation function are further overlaid on the first perspective image. The first function refers to other functions than the perspective rotation function, and the second function refers to other functions than the perspective rotation function. For example, the other functions may be a start-shooting function, a probe function, a shooting function, or the like.

In some embodiments, the first function control includes at least one of a start-shooting control, a probe control, and a shooting control.

In some embodiments, the second function control includes at least one of a start-shooting control, a probe control, and a shooting control.

In some embodiments, the first function control is different from the second function control. For example, the first function control is the start-shooting control and the second function control is the probe control.

The start-shooting control is configured to turn on or off a gun sight; the gun sight is configured to assist in aiming a target during shooting, for example, the gun sight may include a power lens, a red dot sight, a holographic sight, and the like. The probe is configured to control a head of the virtual character out for shooting when a shelter exists, so as to reduce an exposure area thereof. The shooting control is configured to control firing, for example, controlling a virtual rifle to fire at the target.

Step 202: Receive a first perspective rotation operation triggered based on the first function control.

The first terminal receives the first perspective rotation operation triggered based on the first function control. In some embodiments, the first perspective rotation operation includes either one of a tap operation and a long press operation.

Step 203: Enable the first function and the perspective rotation function of the first function control and switch the first perspective image to a second perspective image according to the first perspective rotation operation.

The terminal rotates by a corresponding angle using the first perspective direction as a standard according to the first perspective rotation operation to rotate the first perspective image to the second perspective image. In some embodiments, the second perspective image is an image of the virtual environment observed using a second perspective direction of the virtual character in the virtual environment.

In some embodiments, the terminal generates a first sequential number of the first function control according to the first perspective rotation operation, the first sequential number being used for determining to enable or disable the perspective rotation operation of the first function control.

Exemplarily, when the first function control is the start-shooting control, the terminal turns on the gun sight, enables the perspective rotation operation, and switches the first perspective image to the second perspective image according to the first perspective rotation operation.

In a case that the first function control is the probe control, the terminal enables the probe function, enables the perspective rotation function, and switches the first perspective image to a second perspective image according to the first perspective rotation operation.

In a case that the first function control is the shooting control, the terminal fires, enables the perspective rotation function, and switches the first perspective image to a second perspective image according to the first perspective rotation operation. For the shooting control to control firing includes two modes: first, pressing firing; and second, loosening firing. Therefore, the terminal firing according to the first perspective rotation operation may be firing when the shooting control is pressed and may also be firing when the shooting control is pressed and then loosened.

Step 204: Receive a second perspective rotation operation triggered based on the second function control while the first function control is in an enabled state.

In some embodiments, the terminal receives a second perspective rotation operation triggered based on the second function control when the first function and the perspective rotation function of the first function control are both in the enabled state.

In some embodiments, the second perspective rotation operation includes either one of a tap operation and a long press operation.

Step 205: Disable the perspective rotation function of the first function control, enable the second function and the perspective rotation function of the second function control, and switch the second perspective image to a third perspective image according to the second perspective rotation operation.

The terminal rotates by a corresponding angle using the second perspective direction as a standard according to the second perspective rotation operation to rotate the second perspective image to the third perspective image. In some embodiments, the third perspective image is an image of the virtual environment observed using a third perspective direction of the virtual character in the virtual environment.

Exemplarily, when the second function control is the start-shooting control, the terminal turns on the gun sight, enables the perspective rotation operation, and switches the second perspective image to the third perspective image according to the second perspective rotation operation.

In a case that the second function control is the probe control, the terminal enables the probe function, enables the perspective rotation function, and switches the second perspective image to the third perspective image according to the second perspective rotation operation.

In a case that the second function control is the shooting control, the terminal fires, enables the perspective rotation function, and switches the second perspective image to the third perspective image according to the second perspective rotation operation.

In this case, the first function of the first function control is in an enabled state, for example, the gun sight is in an enabled state, or the probe function is in an enabled state. If the first function control is the shooting control, in a case of a discontinuous shooting state, after firing once, the shooting control is still in the enabled state, but no bullet is shot.

In some embodiments, the exemplary steps for the terminal to enable the perspective rotation function of the second function control are as follows:

1) Generate a second sequential number of the second function control according to the second perspective rotation operation.

The second sequential number is used for determining to enable or off the perspective rotation operation of the second function control.

In some embodiments, the first function control includes first function controls in an enabled state, and the first function controls in the enabled state each correspond to a first sequential number. The exemplary steps for generating the second sequential number are as follows:

a) Obtain a maximum sequential number from the first sequential numbers according to the second perspective rotation operation.

b) Add 1 to the maximum sequential number to obtain the second sequential number.

That is, the maximum sequential number is x, and thus the second sequential number is x+1; for example, the first sequential number includes 1 and 2, and the maximum sequential number is 2, and therefore, the second sequential number is determined as 3.

2) In a case that the second sequential number is greater than a first sequential number, disable the perspective rotation function of the first function control and enable the second function and the perspective rotation function of the second function control, the first sequential number being a sequential number of the first function control.

The terminal determines whether the second sequential number is greater than the first sequential number; when the second sequential number is greater than the first sequential number, the terminal disables the perspective rotation function of the first function control and enables the second function and the perspective rotation function of the second function control.

In summary, the method for perspective rotation provided in this embodiment includes: displaying, on a terminal, a first perspective image of an application program; a first function control for supporting a first function and a perspective rotation function and a second function control for supporting a second function and the perspective rotation function being overlaid on the first perspective image; receiving, by the terminal, a first perspective rotation operation triggered based on the first function control; enabling the first function and the perspective rotation function of the first function control and switching the first perspective image to a second perspective image according to the first perspective rotation operation; receiving a second perspective rotation operation triggered based on the second function control while the first function control is in an enabled state; and disabling the perspective rotation function of the first function control, enabling the second function and the perspective rotation function of the second function control, and switching the second perspective image to a third perspective image according to the second perspective rotation operation.

The method can further respond to the perspective rotation operation triggered based on the second function control while the perspective rotation function of the first function control is triggered, that is, a screen may respond to the perspective rotation operations of at least two contact points at the same time, improving the interaction efficiency in an operation process. Moreover, in this method, when the first function control is in the enabled state, based on the perspective rotation function triggered by the second function, the terminal first responds to the perspective rotation operation triggered based on the second function control, ensuring that a plurality of function controls having the perspective rotation function are all enabled, and ensuring the orderliness and accuracy of the response of the terminal to the perspective rotation operation.

In the game types such as the FPS game, the TPS game, and the MOBA game, the settings of multiple function controls having the perspective rotation function ensure free completion of the perspective rotation operations by a player in different states, to provide more flexibility and operation space for fights.

Figure 5:
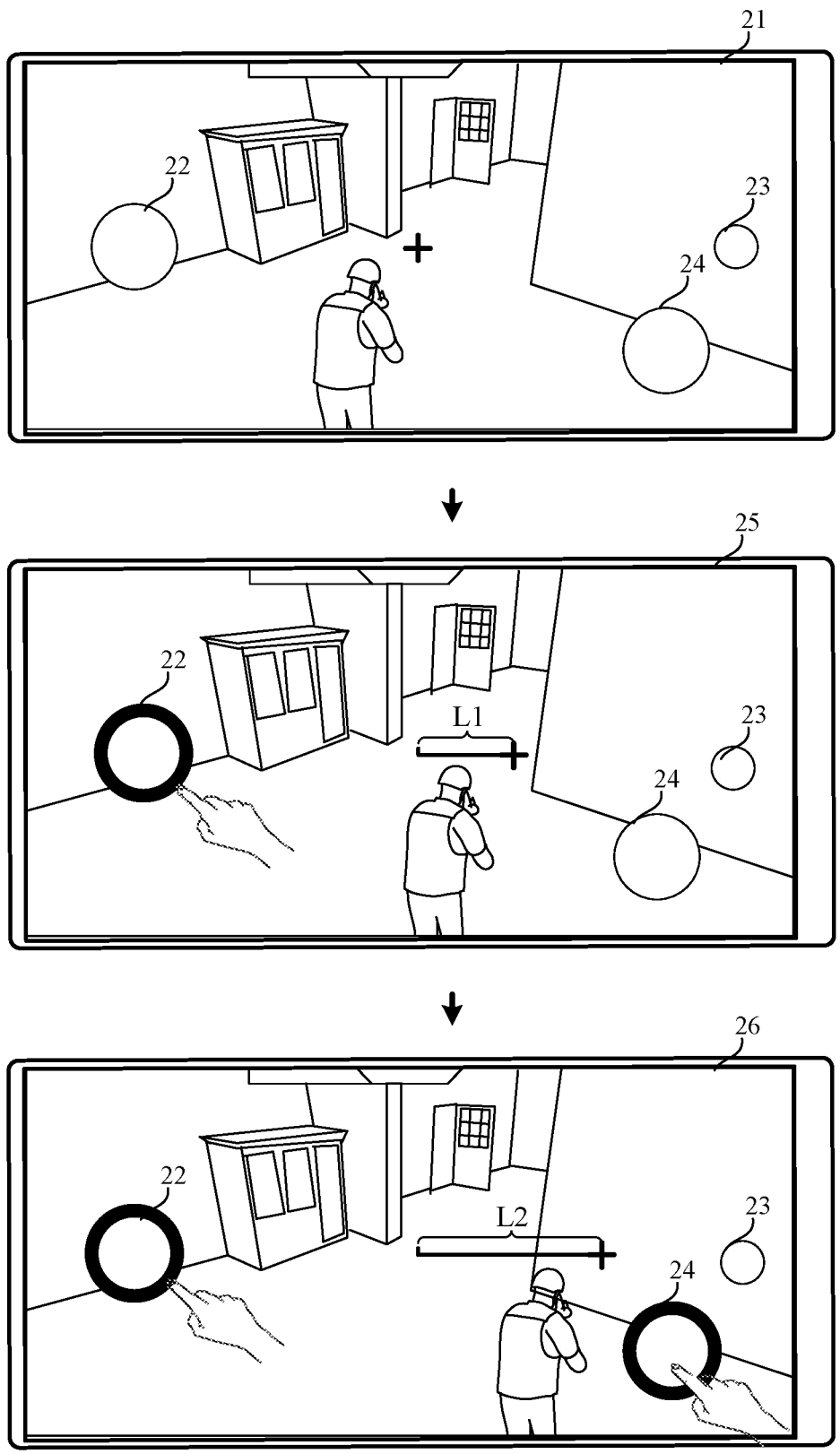
FIG. 5 is a schematic diagram of a perspective rotation interface according to an exemplary embodiment of this application.

Exemplarily, as shown in FIG. 5, the switching of the perspective rotation functions of the first function control and the second function control is shown. Taking the first function controls to be the probe control and the start-shooting control and the second function control to be the shooting control as an example, a user interface 21 in the first perspective includes a probe control 22, a start-shooting control 23, and a shooting control 24. The terminal receives a first perspective rotation operation based on the probe control 22, and rotates a first perspective image to a second perspective image, for example, a user interface 25 in a second perspective; with respect to the first perspective, the second perspective moves rightwards by a distance L1; while the probe control 22 is triggered, the terminal receives a second perspective rotation operation based on a shooting control 24, and rotates the second perspective image to a third perspective image, for example, a user interface 26 in a third perspective; and with respect to the first perspective, the third perspective moves rightwards by a distance L2.

Figure 6:
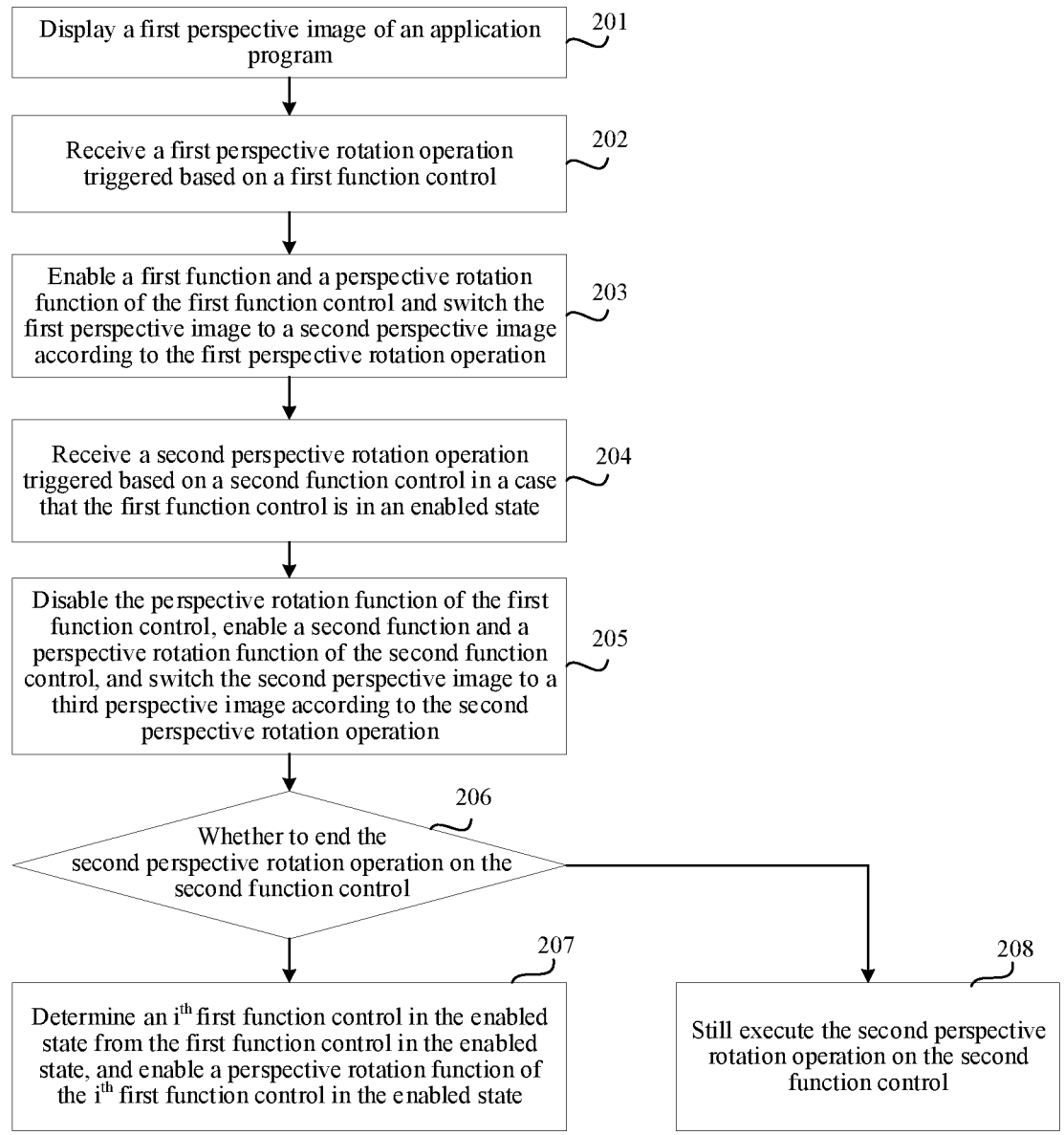
FIG. 6 is a flow chart of a method for perspective rotation according to another exemplary embodiment of this application.

Based on FIG. 4, if the first function control includes the first function controls in the enabled state, when the perspective rotation function of the second function control is disabled, the terminal can determine one function control from the first function control to execute the perspective rotation operation. Exemplarily, steps 206 to step 208 are added after step 205. As shown in FIG. 6, the steps are as follows:

Step 206: Determine whether to end the second perspective rotation operation on the second function control.

The terminal determines whether to end the second perspective rotation operation on the second function control. In a case that the terminal ends the second perspective rotation operation on the second function control, step 207 is performed. In a case that the terminal does not end the second perspective rotation operation on the second function control, step 208 is performed.

In some embodiments, the terminal adopts a drag operation for the perspective rotation of the virtual character; that is, the second perspective rotation operation further includes a drag operation.

Exemplarily, the second perspective rotation operation includes a tap operation and the drag operation. In a case that the terminal ends the drag operation and the tap operation on the second function control, step 207 is performed, otherwise step 208 is performed. Otherwise, the second perspective rotation operation includes a long press operation and the drag operation. In a case that the terminal ends the drag operation and the long press operation on the second function control, step 207 is performed, otherwise step 208 is performed.

The second perspective rotation operation on the second function control is ended, i.e., the perspective rotation function on the second function control is disabled.

Step 207: Determine an $i^{th}$ first function control in the enabled state from the first function controls in the enabled state, and enable the perspective rotation function of the $i^{th}$ first function control in the enabled state.

In a case that the perspective rotation function on the second function control is disabled, and the first function control is in the enabled state, the terminal determines the $i^{th}$ first function control in the enabled state from the first function controls in the enabled state, and enable the perspective rotation function of the $i^{th}$ first function control in the enabled state, i being a positive integer.

In some embodiments, when the first sequential number of the $i^{th}$ first function control in the enabled state is a maximum sequential number, the perspective rotation function of the $i^{th}$ function control in the enabled state is enabled.

That is, n first function controls in the enabled state respectively correspond to n first sequential numbers; the maximum sequential number is determined from the n first sequential numbers; the $i^{th}$ first function control in the enabled state corresponding to the maximum sequential number is screened out, and the perspective rotation function of the $i^{th}$ first function control in the enabled state is enabled, n being a positive integer.

Step 208: Still execute the second perspective rotation operation on the second function control.

In conclusion, the method for perspective rotation provided in this embodiment includes: in a case of ending the second perspective rotation operation on the second function control, if a plurality of first function controls are in the enabled state, determining a first function control to automatically take over the perspective rotation, to guarantee, to the utmost, the orderliness and accuracy of the response of the terminal to the perspective rotation operation for a plurality of function controls having the perspective rotation function. Moreover, for disappearing of a perspective rotation contact, another perspective rotation contact can be used for supporting a response of the perspective rotation, and a condition of image stuck and stopped caused by further triggering the perspective rotation contact can also be avoided.

Figure 7:
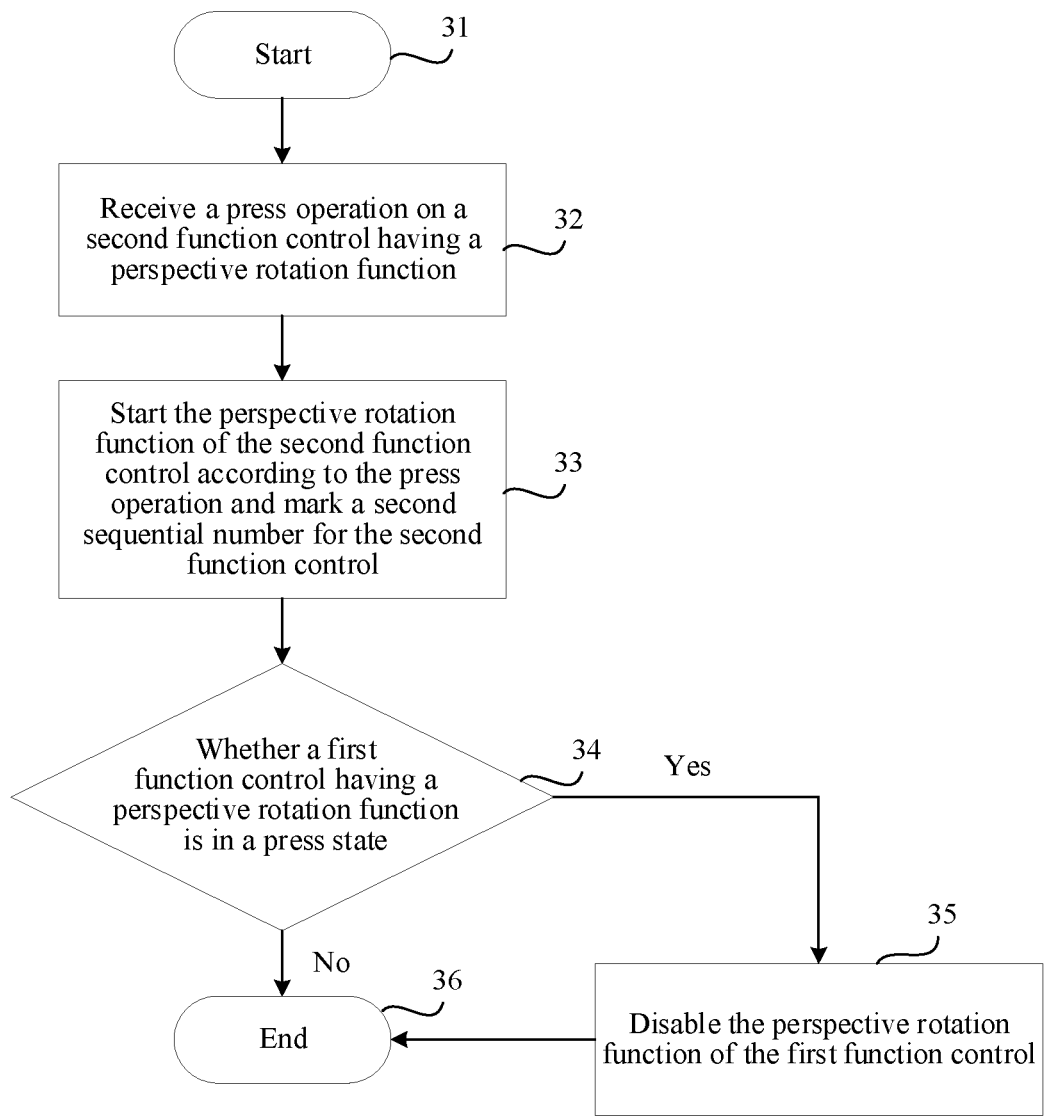
FIG. 7 is a flow chart of a method for perspective rotation according to another exemplary embodiment of this application.

Exemplarily, in the embodiment shown in FIG. 6, according to the operation state on the second function control, it can be divided into a press process and a loosen process for explanation. FIG. 7 is an exemplary explanation of the press process of the second function control:

Step 31: Start.

Step 32: The terminal receives a press operation on the second function control having the perspective rotation function (triggering of the second perspective rotation operation).

Step 33: The terminal enables the perspective rotation function of the second function control according to the press operation and marks the second sequential number for the second function control.

While pressing the perspective rotation function of the second function control according to the press operation, the terminal marks the second sequential number for the second function control. Exemplarily, the last triggered function control having the perspective rotation function is marked with the sequential number x, and thus the second sequential number is x+1; that is, before the second function control is triggered, x is the maximum sequential number, x being a positive integer.

Step 34: The terminal determines whether the first function control having the perspective rotation function is in a press state.

The terminal determines that the first function control having the perspective rotation function is in the press state, and step 35 is performed, otherwise step 36 is performed.

Step 35: The terminal disables the perspective rotation function of the first function control.

Step 36: End.

End herein refers to ending the search for the first function controls in the press state but still keeping the perspective rotation function of the second function control in the enabled state.

Figure 8:
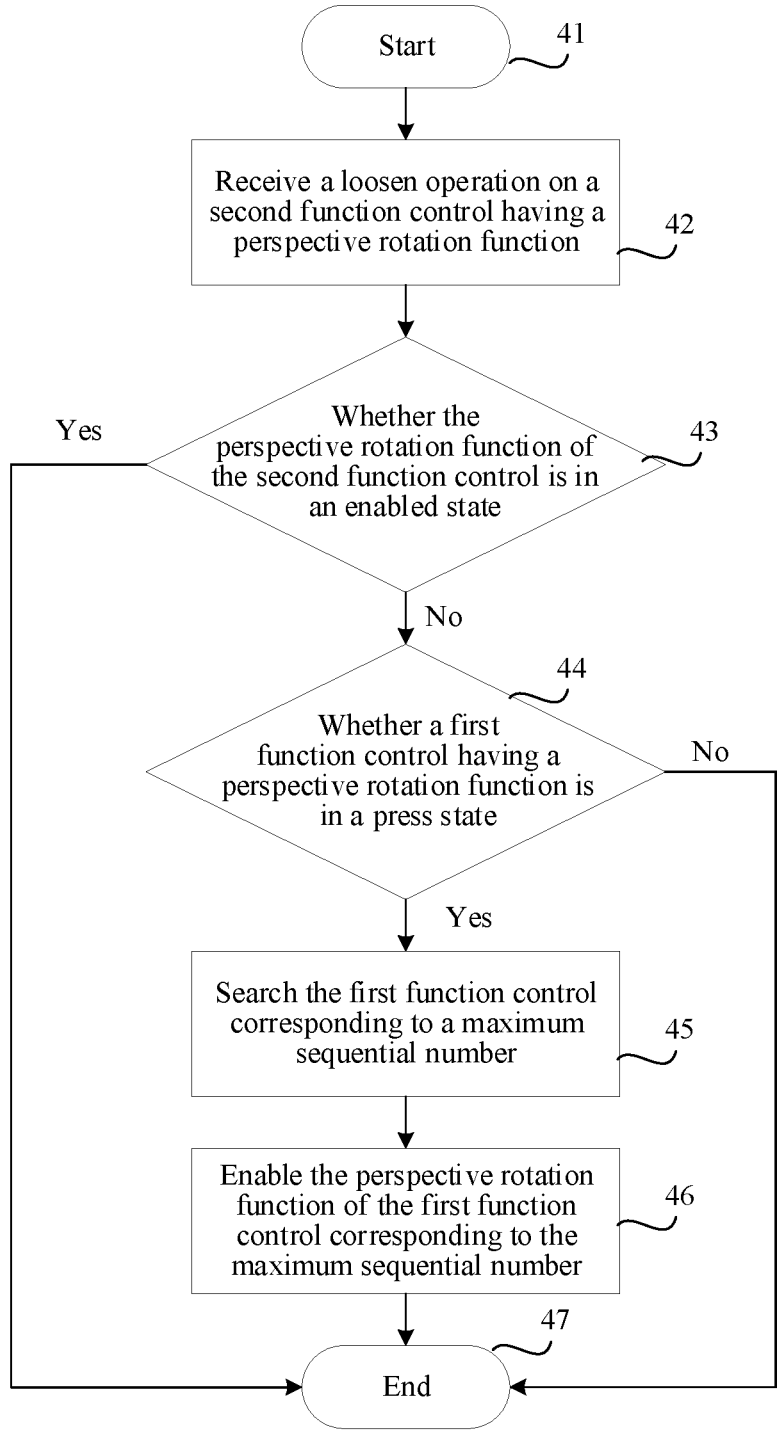
FIG. 8 is a flow chart of a method for perspective rotation according to another exemplary embodiment of this application.

FIG. 8 is an exemplary explanation of a loosening process of the second function control:

Step 41: Start.

Step 42: The terminal receives a loosen operation on the second function control having the perspective rotation function (canceling of the second perspective rotation operation).

Step 43: The terminal determines whether the perspective rotation function of the second function control is in the enabled state.

In a case that the terminal determines that the perspective rotation function of the second function control is in the enabled state, step 47 is performed, otherwise step 44 is performed.

Step 44: The terminal determines whether the first function control having the perspective rotation function is in a press state.

The terminal determines that the first function control having the perspective rotation function is in the press state, and step 45 is performed, otherwise step 47 is performed.

Step 45: The terminal searches for the first function control corresponding to the maximum sequential number.

The terminal determines the first function control corresponding to the maximum sequential number from the n first function controls in the press state.

Step 46: The terminal enables the perspective rotation function of the first function control corresponding to the maximum sequential number.

Step 47: End.

Figure 9:
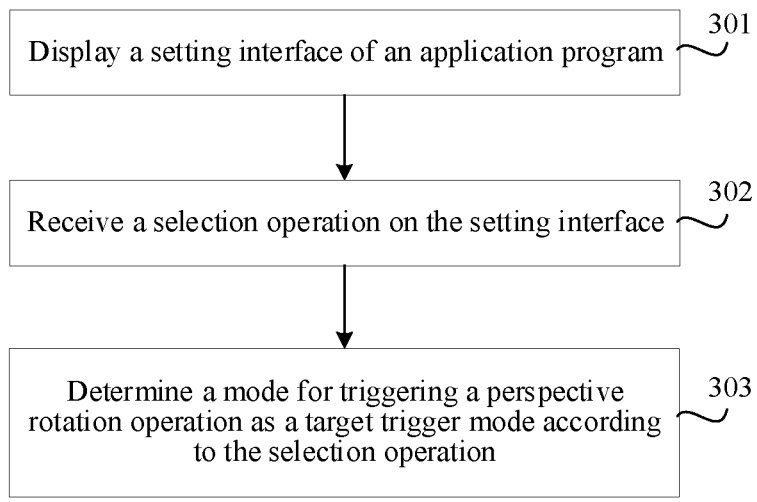
FIG. 9 is a flow chart of a perspective rotation operation setting method according to an exemplary embodiment of this application.

In some embodiments, the user may customize the mode for triggering the perspective rotation operation, for example, the user may define the mode for triggering the perspective rotation operation to be the tap operation, the long press operation, the touch operation, or the like. The customizing the mode for triggering the perspective rotation operation is explained in FIG. 9, and the steps are as follows:

Step 301: Display a setting interface of an application program.

The terminal displays the setting interface of the application program, the setting interface includes at least two mode setting controls, and the mode setting controls are configured to set a mode for triggering a perspective rotation operation.

In some embodiments, the mode setting control includes at least two of a tap mode setting control, a long press mode setting control, and a mixed mode setting control.

A perspective rotation operation corresponding to the tap mode setting control is the tap operation; a perspective rotation operation corresponding to the long press mode setting control is the long press operation; and a perspective rotation operation corresponding to the mixed mode setting control is the touch operation. A duration of the touch operation is used for determining the enabling or off of the second function of the second function control.

In some embodiments, the perspective rotation operation includes either one of a first perspective rotation operation and a second perspective rotation operation.

Step 302: Receive a selection operation triggered on the setting interface.

The selection operation is used for selecting a mode setting control corresponding to a target trigger mode in the at least two mode setting controls. In some embodiments, the selection operation may include at least one of a single-tap operation, a double-tap operation, a long press operation, and a slide operation.

Step 303: Determine the mode for triggering the perspective rotation operation as a target trigger mode according to the selection operation.

The terminal determines the mode for triggering the perspective rotation operation as a target trigger mode according to the selection operation. In some embodiments, the target trigger mode includes at least two of the tap operation, the long press operation, and the touch operation.

Figure 10:
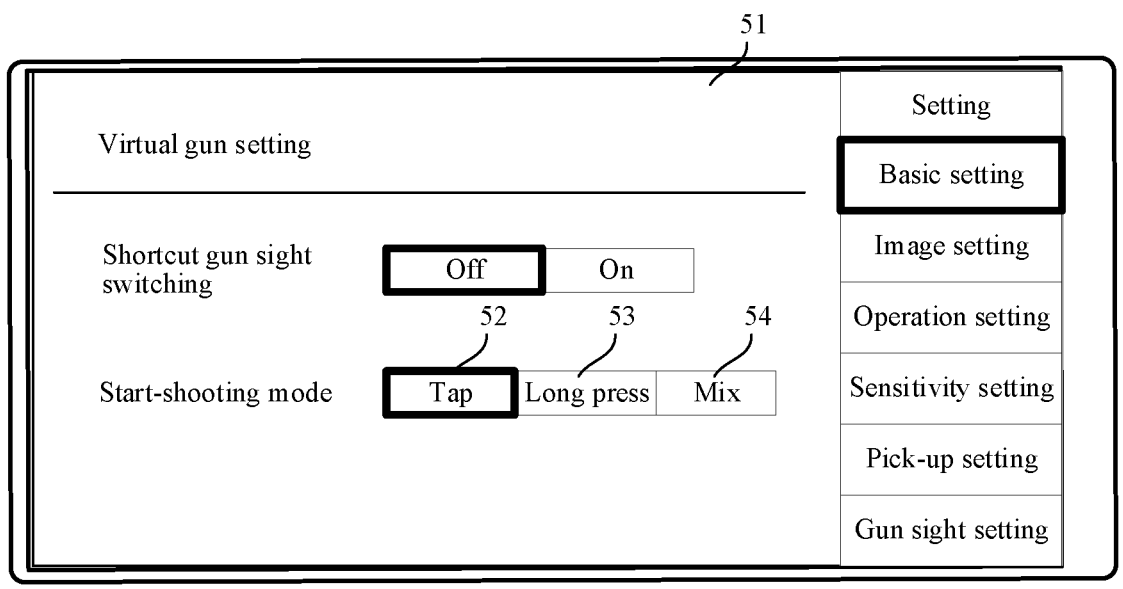
FIG. 10 is a schematic diagram of an interface of a perspective rotation operation setting method according to an exemplary embodiment of this application.

Exemplarily, as shown in FIG. 10, taking the function control to be the start-shooting control as an example, a setting interface 51 of the application program includes setting buttons for three start-shooting modes: a tap mode setting control 52, a long press mode setting control 53, and a mixed mode setting control 54. The user can select any one of the three start-shooting modes.

Figure 11:
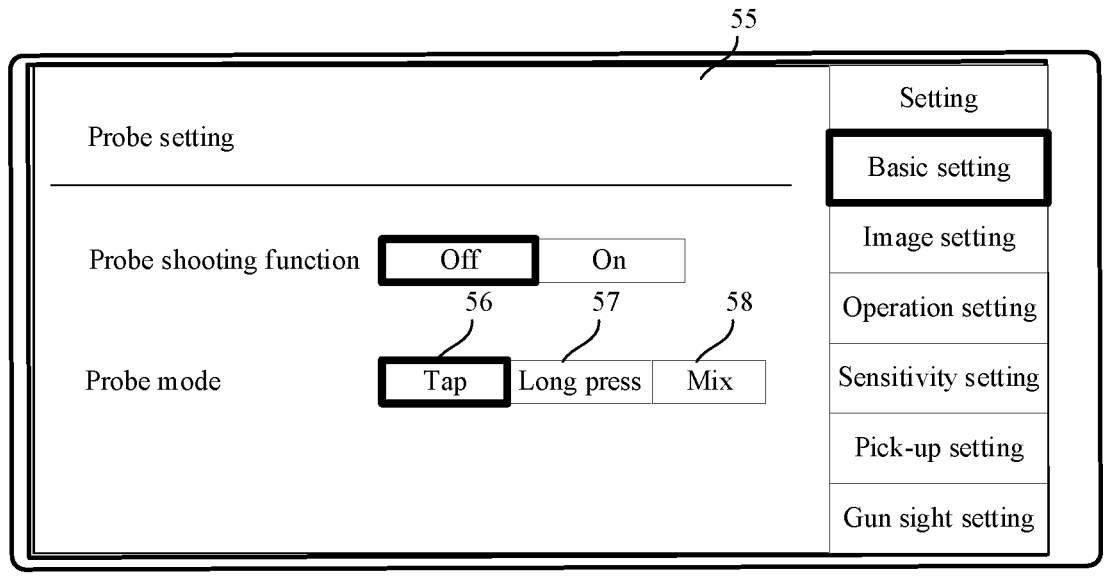
FIG. 11 is a schematic diagram of an interface of a perspective rotation operation setting method according to another exemplary embodiment of this application.

As shown in FIG. 11, taking the function control to be the probe control as an example, a setting interface 55 of the application program includes setting buttons for three probe modes: a tap mode setting control 56, a long press mode setting control 57, and a mixed mode setting control 58. The user can select any one of the three probe modes.

In conclusion, according to the perspective rotation operation setting method according to this embodiment, the user can customize the mode for triggering the perspective rotation operation, to be adapted to shooting habits and operation characteristics of the user, so as to meet independent operation requirements of users in different levels, enrich user selections, and provide more personalized fighting experiences.

The first function control further includes a first function; the second function control further includes a second function; accordingly, the first perspective rotation operation further controls the enabling and disabling of the first function; and the second perspective rotation operation further controls the enabling and disabling of the second function. Taking the enabling and disabling of the second function of the second function control by the second perspective rotation operation as an example, explanations are as follows:

In some embodiments, the target trigger mode includes the tap operation; the terminal enables the second function of the second function control according to the tap operation; and in a case of ending the tap operation, the second function of the second function control is kept in the enabled state.

In some embodiments, under the condition that the second function of the second function control is in the enabled state, the terminal disables the second function of the second function control according to a further tap operation on the second function control.

Figure 12:
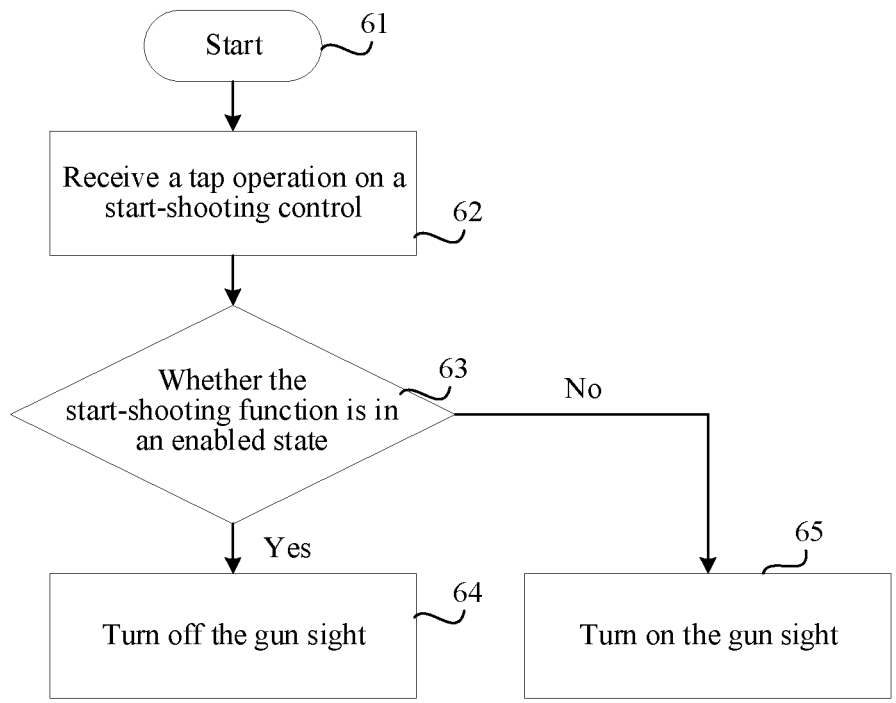
FIG. 12 is a flow chart of a method for perspective rotation according to another exemplary embodiment of this application.

Exemplarily, as shown in FIG. 12, taking the second function control being the start-shooting control and the second function being the start-shooting as an example, in the tap mode, the steps for the start-shooting control to control the turning on and off processes of the gun sight are shown as follows:

Step 61: Start.

Step 62: The terminal receives a tap operation on the start-shooting control.

Step 63: The terminal determines whether the start-shooting function is in the enabled state.

In a case that the terminal determines that the start-shooting function is in the enabled state, step 64 is performed, otherwise step 65 is performed.

Step 64: The terminal turns off the gun sight.

Step 65: The terminal turns on the gun sight.

In some embodiments, the target trigger mode includes the long press operation; the terminal enables the second function of the second function control according to the long press operation; and in a case of ending the long press operation, the second function of the second function control is kept in the enabled state.

In some embodiments, under the condition that the second function of the second function control is in the enabled state, the terminal disables the second function of the second function control according to the tap operation on the second function control.

Figure 13:
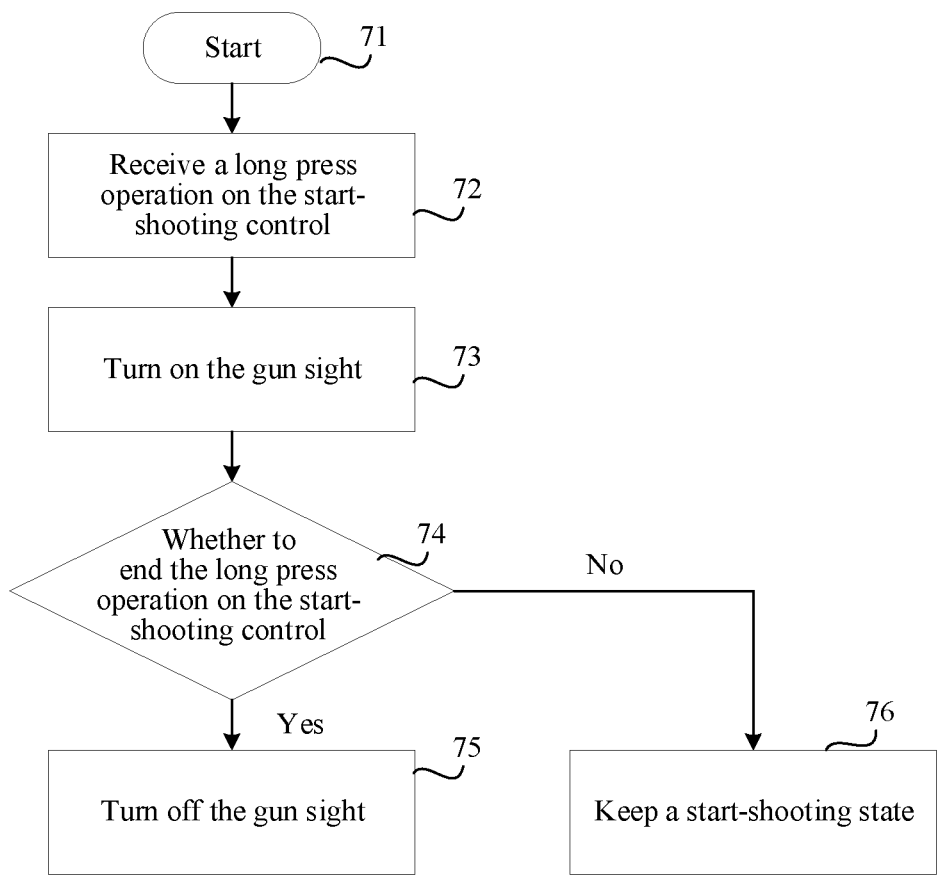
FIG. 13 is a flow chart of a method for perspective rotation according to another exemplary embodiment of this application.

Exemplarily, as shown in FIG. 13, taking the second function control being the start-shooting control and the second function being the start-shooting as an example, in the long press mode, the steps for the start-shooting control to control the turning on and off processes of the gun sight are shown as follows:

Step 71: Start.

Step 72: The terminal receives a long press operation on the start-shooting control.

Step 73: The terminal turns on the gun sight.

Step 74: The terminal determines whether to end the long press operation on the start-shooting control.

In a case that the terminal determines to end the long press operation on the start-shooting control, step 75 is performed, otherwise step 76 is performed.

Step 75: The terminal turns off the gun sight.

Step 76: The terminal keeps the start-shooting state.

In some embodiments, the target trigger mode includes the touch operation; the terminal enables the second function of the second function control according to the touch operation; in a case of ending the touch operation, the duration of the touch operation is obtained; and when the duration is greater than a time threshold, the second function of the second function control is kept in the enabled state. The time threshold is used for keeping the second function of the second function control in the enabled state after determining that the touch operation ends.

In some embodiments, when the duration is less than or equal to the time threshold, the second function of the second function control is disabled.

In some embodiments, under the condition that the second function of the second function control is in the enabled state, the terminal disables the second function of the second function control according to the tap operation on the second function control.

Figure 14:
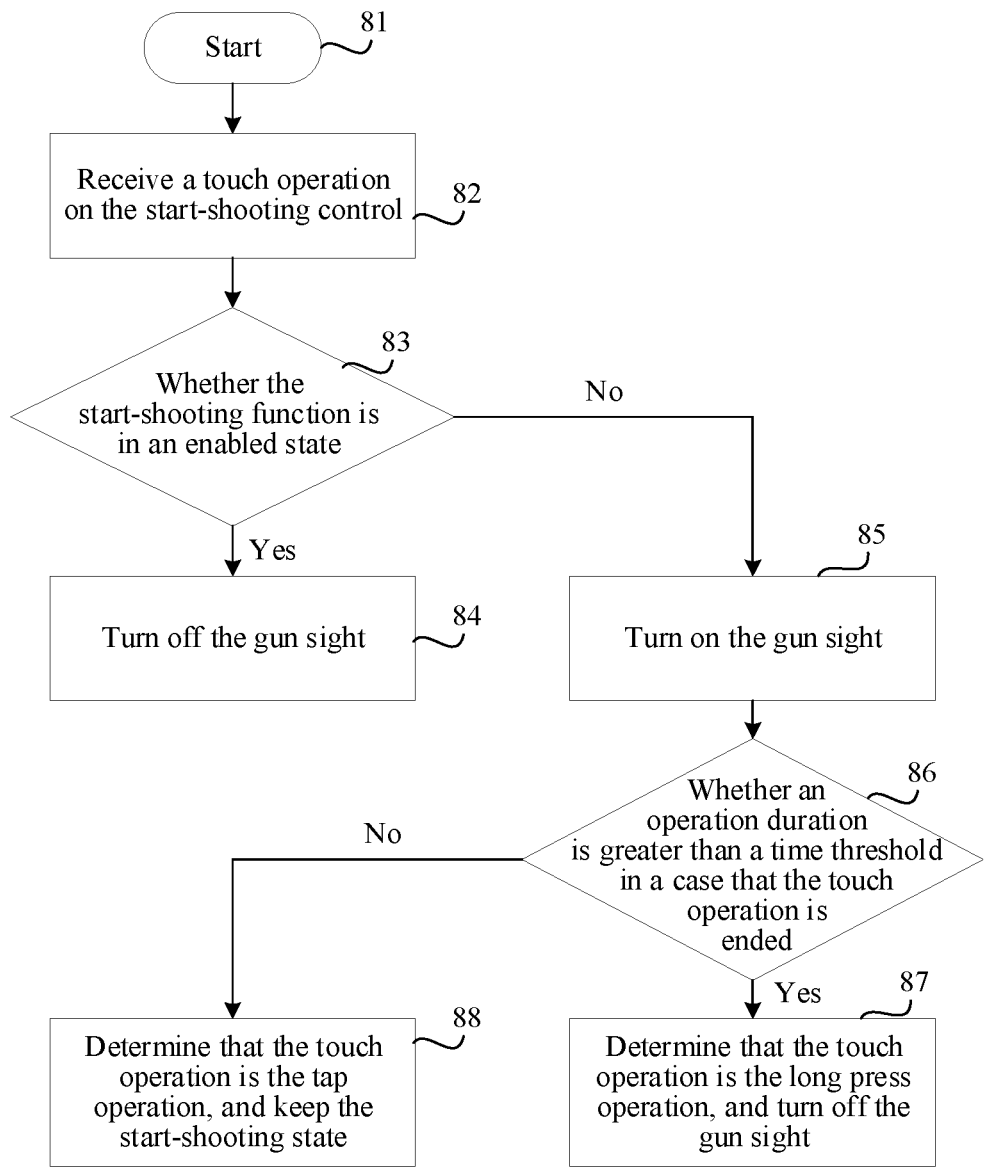
FIG. 14 is a flow chart of a method for perspective rotation according to another exemplary embodiment of this application.

Exemplarily, as shown in FIG. 14, taking the second function control being the start-shooting control and the second function being the start-shooting as an example, in the mixed mode, the steps for the start-shooting control to control the turning on and off processes of the gun sight are shown as follows:

Step 81: Start.

Step 82: The terminal receives a touch operation on the start-shooting control.

Step 83: The terminal determines whether the start-shooting function is in the enabled state.

In a case that the terminal determines that the start-shooting function is in the enabled state, step 84 is performed, otherwise step 85 is performed.

Step 84: The terminal turns off the gun sight.

Step 85: The terminal turns on the gun sight.

Step 86: The terminal determines whether the operation duration at the end of the touch operation is greater than the time threshold.

In a case that the terminal determines that the operation duration at the end of the touch operation is greater than the time threshold, step 87 is performed, otherwise step 88 is performed.

Exemplarily, the time threshold may be 0.2 second (s); when the terminal determines that the operation duration at the end of the touch operation is greater than 0.2 s, step 87 is performed, otherwise step 88 is performed.

Step 87: The terminal determines that the touch operation is the long press operation and keeps the start-shooting state.

Step 88: The terminal determines that the touch operation is the tap operation, and turns off the gun sight.

The processes of controlling the enabling and disabling of the first function of the first function control through the first perspective rotation operation are similar to those of controlling the enabling and disabling of the second function of the second function control through the second perspective rotation operation, and thus are no longer described herein for conciseness.

In some embodiments, when the first function control and the second function control are triggered, a logic responsive to the perspective rotation is user-customized. Exemplarily, the terminal controls the perspective rotation of the virtual character through the first function control according to the customized logic, or controls the perspective rotation of the virtual character through the second function control according to the customized logic, where the customized logic is a user-customized logic responsive to a perspective rotation operation when the first function control and the second function control are triggered.

For example, the customized logic is: when the first function control and the second function control are triggered at the same time, the terminal enables the perspective rotation function of the first function control and disables the perspective rotation control of the second function control. Hence, when the first function control and the second function control are triggered at the same time, the terminal controls the perspective rotation of the virtual character through the first function control.

In some embodiments, the terminal further controls the perspective rotation of the virtual character through the gyroscope. In a case that the first function control and/or the second function control is triggered at the same time, the terminal receives the rotation operation thereof and controls the perspective rotation of the virtual character through the gyroscope.

In conclusion, the method for perspective rotation according to this embodiment provides the function of a user-customized logic responsive to a perspective rotation, so that the user can customize the control operation logic having the perspective rotation function that more meets operation habits thereof, improving the operation experiences during user fights.

In addition, the perspective rotation of the virtual character can be further controlled through the gyroscope, so that the user may also control other operations of the virtual character while rotating the perspective of the virtual character, improving the interaction experiences during fights.

Figure 15:
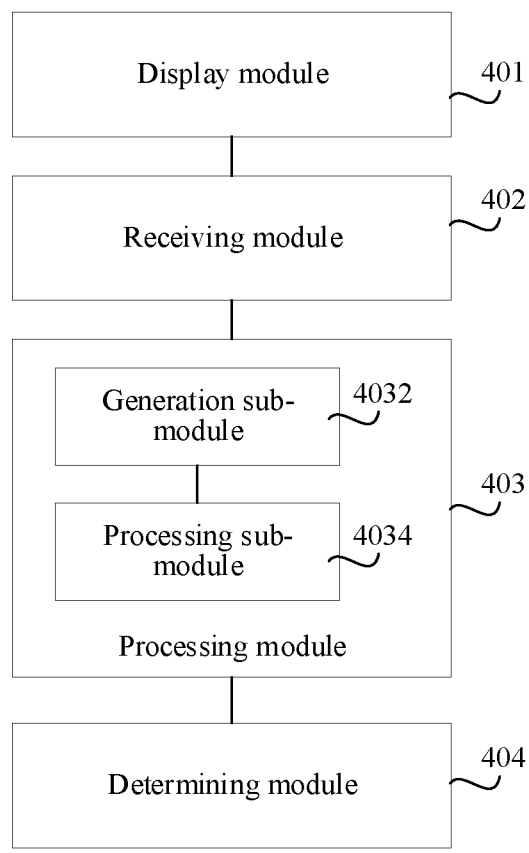
FIG. 15 is a block diagram of an apparatus for perspective rotation according to an exemplary embodiment of this application.

FIG. 15 relates to an apparatus for perspective rotation according to an exemplary embodiment of this application. The apparatus may constitute some or all of the terminal through software, hardware, or a combination thereof. The apparatus includes:

a display module 401, configured to display a first perspective image of an application program associated with the virtual environment, the first perspective image being an image of a virtual environment observed using a first perspective direction of a virtual character in the virtual environment, and a first function control for supporting a first function and a perspective rotation function and a second function control for supporting a second function and the perspective rotation function being overlaid on the first perspective image;

a receiving module 402, configured to receive a first perspective rotation operation triggered based on the first function control;

a processing module 403, configured to enable the first function and the perspective rotation function of the first function control and switch the first perspective image to a second perspective image according to the first perspective rotation operation, the second perspective image being an image of the virtual environment observed using a second perspective direction of the virtual character in the virtual environment;

the receiving module 402, configured to receive a second perspective rotation operation triggered based on the second function control while the first function control is in an enabled state; and the processing module 403, configured to disable the perspective rotation function of the first function control, enable the second function and the perspective rotation function of the second function control, and switch the second perspective image to a third perspective image according to the second perspective rotation operation, the third perspective image being an image of the virtual environment observed using a third perspective direction of the virtual character in the virtual environment.

In some embodiments, the processing module 403 includes:

a generation sub-module 4032, configured to generate a second sequential number of the second function control according to the second perspective rotation operation; and a processing sub-module 4034, configured to disable the perspective rotation function of the first function control and enable the second function and the perspective rotation function of the second function control when the second sequential number is greater than the first sequential number, the first sequential number being a sequential number of the first function control.

In some embodiments, the first function control includes first function controls in an enabled state, and the first function controls in the enabled state each correspond to a first sequential number.

The generation sub-module 4032 is configured to obtain a maximum sequential number from the first sequential numbers according to the second perspective rotation operation and add 1 to the maximum sequential number to obtain the second sequential number.

In some embodiments, the first function control includes first function controls in an enabled state.

The processing sub-module 4034 is configured to, when the second perspective rotation operation based on the second function control ends, determine an $i^{th}$ first function control in the enabled state from the first function controls in the enabled state, and enable the perspective rotation function of the $i^{th}$ first function control in the enabled state, i being a positive integer.

In some embodiments, the first function controls in the enabled state each correspond to a first sequential number.

The processing sub-module 4034 is configured to enable the perspective rotation function of the $i^{th}$ function control in the enabled state when the first sequential number of the $i^{th}$ first function control in the enabled state is a maximum sequential number.

In some embodiments,
the display module 401 is configured to display a setting interface of the application program, the setting interface including at least two mode setting controls, and the mode setting controls being configured to set a mode for triggering a perspective rotation operation.

The receiving module 402 is configured to receive a selection operation triggered on the setting interface, the selection operation being used for selecting a mode setting control corresponding to a target trigger mode in at least two mode setting controls.

The determining module 404 is configured to determine the mode for triggering the perspective rotation operation as a target trigger mode according to the selection operation.

The perspective rotation operation includes either one of a first perspective rotation operation and a second perspective rotation operation.

In some embodiments, the perspective rotation operation includes a second perspective rotation operation, and the target trigger mode includes a tap operation.

The processing module 403 is configured to enable the second function of the second function control according to the tap operation, and in a case of ending the tap operation, keep the second function of the second function control in the enabled state.

In some embodiments, the perspective rotation operation includes the second perspective rotation operation, and the target trigger mode includes a long press operation.

The processing module 403 is configured to enable the second function of the second function control according to the long press operation, and in a case of ending the long press operation, keep the second function of the second function control in the enabled state.

In some embodiments, the perspective rotation operation includes the second perspective rotation operation, and the target trigger mode includes a touch operation.

The processing module 403 is configured to enable the second function of the second function control according to the touch operation, obtain a duration of the touch operation in a case of ending the touch operation, and keep the second function of the second function control in the enabled state when the duration is greater than a time threshold.

In some embodiments, the processing module 403 is configured to disable the second function of the second function control when the duration is less than or equal to the time threshold.

In some embodiments, the processing module 403 is configured to control the perspective rotation of the virtual character through the first function control according to the customized logic, or control the perspective rotation of the virtual character through the second function control according to the customized logic, where the customized logic is a user-customized logic responsive to a perspective rotation operation when the first function control and the second function control are triggered. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In summary, according to the apparatus for perspective rotation according to this embodiment, a terminal displays a first perspective image of an application program; a first function control for supporting a first function and a perspective rotation function and a second function control for supporting a second function and the perspective rotation function being overlaid on the first perspective image; the terminal receives a first perspective rotation operation triggered based on the first function control; the first function and the perspective rotation function of the first function control are enabled, and the first perspective image is switched to a second perspective image according to the first perspective rotation operation; a second perspective rotation operation triggered based on the second function control is received while the first function control is in an enabled state; and the perspective rotation function of the first function control is disabled, the second function and the perspective rotation function of the second function control are enabled, and the second perspective image is switched to a third perspective image according to the second perspective rotation operation.

The apparatus can further respond to the perspective rotation operation triggered based on the second function control while the perspective rotation function of the first function control is triggered, i.e., a screen may respond to the perspective rotation operations of at least two contact points at the same time, improving the interaction efficiency during an operation process. Moreover, in this apparatus, when the first function control is in the enabled state, based on the perspective rotation function triggered by the second function, the terminal first responds to the perspective rotation operation triggered based on the second function control, ensuring that a plurality of function controls having the perspective rotation function are all enabled, and ensuring the orderliness and accuracy of the response of the terminal to the perspective rotation operation.

In the game types such as the FPS game, the TPS game, and the MOBA game, the settings of multiple function controls having the perspective rotation function ensure free completion of the perspective rotation operations by a player in different states, to provide more flexibility and operation space for fights.

Figure 16:
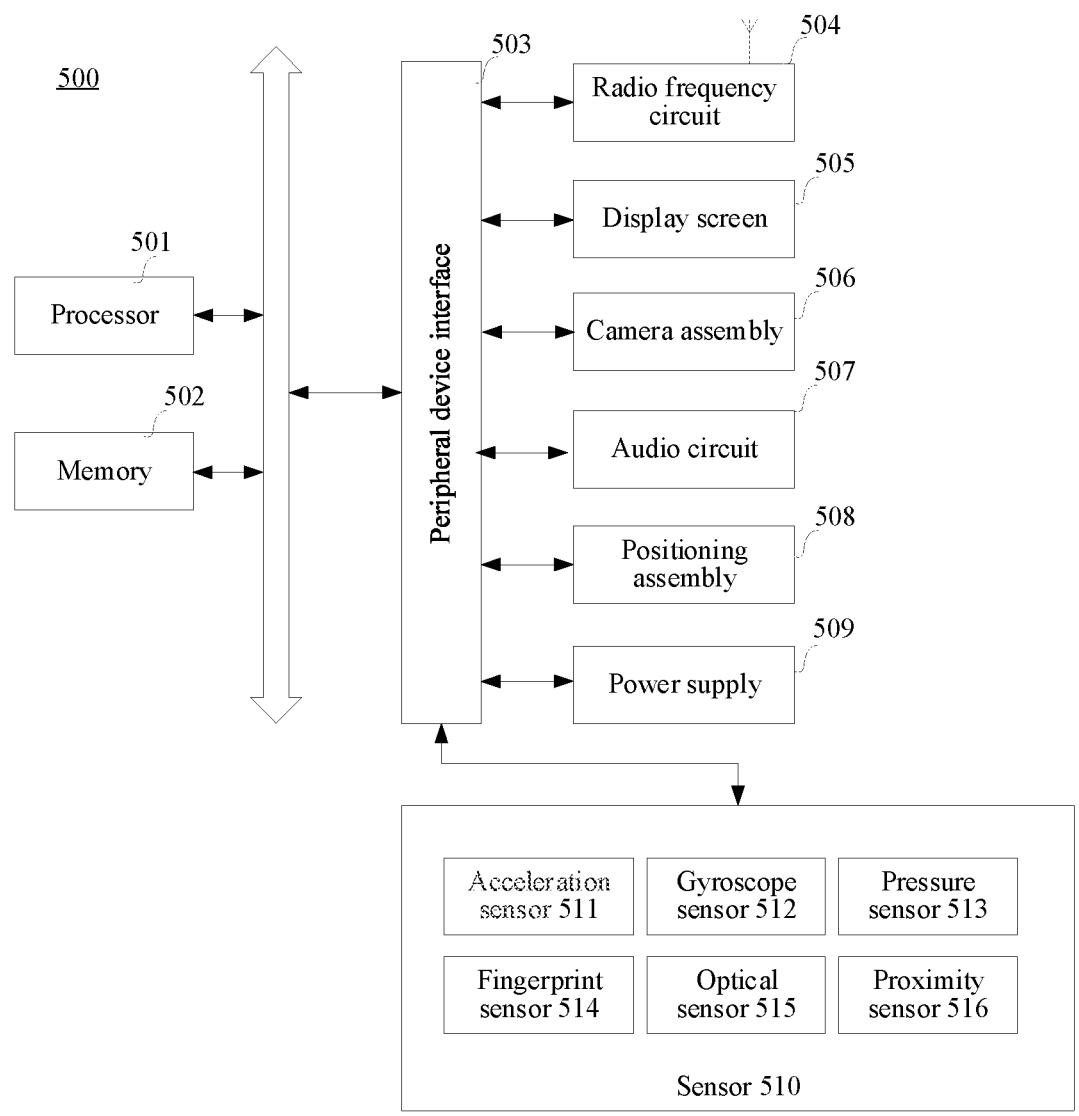
FIG. 16 is a structural block diagram of a terminal according to an exemplary embodiment of this application.

FIG. 16 is a structural block diagram of a terminal 500 according to an exemplary embodiment of the present disclosure. The terminal 500 may be a smart phone, a tablet PC, a Moving Picture Experts Group Audio Layer III (MP3), a Moving Picture Experts Group Audio Layer IV (MP4) player, a laptop computer, or a desktop computer. The terminal 500 may also be referred to as another name such as user equipment, a portable terminal, a laptop terminal, or a desktop terminal.

Generally, the terminal 500 includes a processor 501 and a memory 502.

The processor 501 may include one or more processing cores, for example, a 4-core processor or an 8-core processor. The processor 501 may be implemented by using at least one hardware form of a digital signal processor (DSP), a field-programmable gate array (FPGA), and a programmable logic array (PLA). The processor 501 may also include a main processor and a co-processor; the main processor is a processor for processing data in an awakened state, which is also referred to as a Central Processing Unit (CPU); and the co-processor is a low-consumption processor for processing data in a standby state. In some embodiments, the processor 501 may be integrated with a Graphics Processing Unit (GPU), which is responsible for rendering and drawing a content required to be displayed by a display screen. In some embodiments, the processor 501 may further include an Artificial Intelligence (AI) processor, which is configured to process a machine learning related computing operation.

The memory 502 may include one or more computer-readable storage medium. The computer-readable storage medium may be non-transient. The memory 502 may further include a high-speed random access memory and a nonvolatile memory, for example, one or more disk storage devices or flash storage devices. In some embodiments, the non-transitory computer-readable storage medium in the memory 502 is configured to store at least one instruction, the at least one instruction being configured to be executed by the processor 501 to implement the perspective rotation method provided in the method embodiments of this application.

In some embodiments, the terminal 500 may optionally include: a peripheral device interface 503 and at least one peripheral device. The processor 501, the memory 502, and the peripheral device interface 503 may be connected to each other through a bus or a signal line. Each peripheral device may be connected to the peripheral device interface 503 through the bus, the signal line, or a circuit board. Specifically, the peripheral device includes: at least one of a radio frequency circuit 504, a touch display screen 505, a camera 506, an audio circuit 507, a positioning assembly 508, and a power supply 509.

The peripheral device interface 503 may be configured to connect at least one peripheral device related to Input/Output (I/O) to the processor 501 and the memory 502. In some embodiments, the processor 501, the memory 502 and the peripheral device interface 503 are integrated on a same chip or circuit board. In some other embodiments, any one or two of the processor 501, the memory 502, and the peripheral device interface 503 may be implemented on a single chip or circuit board, which is not limited in this embodiment.

The radio frequency circuit 504 is configured to receive and transmit a Radio Frequency (RF) signal, also referred to as an electromagnetic signal. The RF circuit 504 communicates with a communication network and other communication devices through the electromagnetic signal. The RF circuit 504 converts an electrical signal into the electromagnetic signal for transmission, or converts the received electromagnetic signal into the electrical signal. In some embodiments, the RF circuit 504 includes: an antenna system, an RF transceiver, one or more amplifiers, a tuner, an oscillator, a digital signal processor, a codec chip set, a subscriber identity module card, and the like. The RF circuit 504 may communicate with other terminals through at least one wireless communication protocol. The wireless communication protocol includes, but is not limited to, World Wide Web (WWW), Metropolitan Area Network (MAN), Intranet, each generation of mobile communication networks (2G, 3G, 4G, and 5G), Wireless Local Area Network (WLAN) and/or Wireless Fidelity (Wi-Fi) networks. In some embodiments, the RF circuit 504 may further include a circuit related to Near Field Communication (NFC), which is not limited by this application.

The display screen 505 is configured to display a User Interface (UI). The UI may include a graph, text, an icon, a video, and any combination thereof. In a case that the display screen 505 is a touch display screen, the display screen 505 further includes a capability of collecting a touch signal on or above a surface of the display screen 505. The touch signal may be inputted to the processor 501 as a control signal for processing. At this time, the display screen 505 may further provide a virtual button and/or a virtual keyboard, also referred to as a soft button and/or a soft keyboard. In some embodiments, the display screen 505 may be one disposed at a front panel of the terminal 500; in some other embodiments, the display screens 505 may be at least two, respectively disposed at different surfaces of the terminal 500 or in a folded design; in yet some other embodiments, the display screen 505 may be a flexible display screen disposed on a bending surface or folding surface of the terminal 500. Even, the display screen 505 may be further set in a non-rectangular irregular pattern, namely, a special-shaped screen. The display screen 505 may be prepared by materials such as a Liquid Crystal Display (LCD) and an Organic Light-Emitting Diode (OLED).

The camera component 506 is configured to collect images or videos. In some embodiments, the camera component 506 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each of which is a main camera, a depth-of-field camera, a wide-angle camera, and a telephoto camera, so as to realize fusion of the main camera and the depth-of-field camera to implement fusion of the background blur function, the main camera and the wide-angle camera to realize panoramic photographing and Virtual Reality (VR) photographing functions or other fusion photographing functions. In some embodiments, the camera component 506 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 507 may include a microphone and a speaker. The microphone is configured to collect sound waves of a user and an environment, and convert the sound waves into an electrical signal to input to the processor 501 for processing, or input to the radio frequency circuit 504 for implementing voice communication. For the purpose of stereo collection or noise reduction, there may be multiple microphones, which are respectively disposed at different parts of the terminal 500. The microphone may further be an array microphone or an omni-directional collection type microphone. The speaker is configured to convert the electrical signal from the processor 501 or the RF circuit 504 into the sound waves. The speaker may be a conventional film speaker, or may be a piezoelectric ceramic speaker. In a case that the speaker is the piezoelectric ceramic speaker, the speaker not only can convert the electrical signal into sound waves audible to a human being, but also can convert the electrical signal into sound waves inaudible to a human being, for ranging and other purposes. In some embodiments, the audio circuit 507 may further include a headset jack.

The positioning assembly 508 is configured to position a current geographical position of the terminal 500 to implement navigation or Location Based Service (LBS). The positioning assembly 508 may be a positioning assembly based on the US Global Positioning System (GPS), Chinese BeiDou system, or Russian Galileo system.

The power supply 509 is configured to supply power to components in the terminal 500. The power supply 509 may be an alternating current, a direct current, a primary battery, or a rechargeable battery. In a case that the power supply 509 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 500 further includes one or more sensors 510. The one or more sensors 510 include, but are not limited to: an acceleration sensor 511, a gyroscope sensor 512, a pressure sensor 513, a fingerprint sensor 514, an optical sensor 515, and a proximity sensor 516.

The acceleration sensor 511 can detect acceleration sizes on three coordinate shafts of a coordinate system established based on the terminal 500. For example, the acceleration sensor 511 can be configured to detect components of gravity acceleration on three coordinate shafts. The processor 501 may control, according to the gravity acceleration signal collected by the acceleration sensor 511, the touch display screen 505 to display on a user interface using a horizontal view or a longitudinal view. The acceleration sensor 511 can further be configured to detect motion data of a game or a user.

The gyroscope sensor 512 may detect a body direction and a rotation angle of the terminal 500. The gyroscope sensor 512 may cooperate with the acceleration sensor 511 to collect a 3D action by the user on the terminal 500. The processor 501 can implement the following functions according to the data collected by the gyroscope sensor 512: motion sensing (for example, changing the UI according to the user's tilt operation), image stabilization during photographing, game control, and inertial navigation.

The pressure sensor 513 may be disposed at a side frame of the terminal 500 and/or a lower layer of the touch display screen 505. In a case that the pressure sensor 513 is disposed at the side frame of the terminal 500, a holding signal of the user for the terminal 500 can be detected for the processor 501 to perform left and right hand recognition or quick operations according to the holding signal collected by the pressure sensor 513. In a case that the pressure sensor 513 is disposed at the lower layer of the touch display screen 505, the processor 501 implements control of operable controls on the UI interface according to a pressure operation on the touch display screen 505 by the user. The operable control includes at least one of a button control, a scroll-bar control, an icon control, and a menu control.

The fingerprint sensor 514 is configured to collect a user's fingerprint, and the processor 501 identifies a user's identity according to the fingerprint collected by the fingerprint sensor 514, or the fingerprint sensor 514 identifies a user's identity according to the collected fingerprint. In a case of identifying that the user's identity is a trusted identity, the processor 501 authorizes the user to perform related sensitive operations. The sensitive operations include: unlocking a screen, viewing encrypted information, downloading software, paying, changing a setting, and the like. The fingerprint sensor 514 may be disposed on the front, back, or side surface of the terminal 500. In a case that a physical button or a vendor logo is disposed on the terminal 500, the fingerprint sensor 514 may be integrated with the physical button or the vendor logo.

The optical sensor 515 is configured to collect ambient light intensity. In an embodiment, the processor 501 may control the display brightness of the touch display screen 505 according to the ambient light intensity collected by the optical sensor 515. Specifically, when the ambient light intensity is relatively high, the display brightness of the touch display screen 505 is increased. When the ambient light intensity is relatively low, the display brightness of the touch display screen 505 is decreased. In another embodiment, the processor 501 may further dynamically adjust a camera parameter of the camera component 506 according to the ambient light intensity collected by the optical sensor 515.

The proximity sensor 516 is also referred to as a distance sensor and is generally disposed at the front panel of the terminal 500. The proximity sensor 516 is configured to collect the distance between the user and the front surface of the terminal 500. In an embodiment, when the proximity sensor 516 detects that a distance between the user and the front surface of the terminal 500 is gradually reduced, the processor 501 controls the touch display screen 505 to be switched from a bright screen state to a rest screen state; and when the proximity sensor 516 detects the distance between the user and the front surface of the terminal 500 is gradually increased, the processor 501 controls the touch display screen 505 to be switched from the rest screen state to the bright screen state.

A person skilled in the art can understand that the structure shown in FIG. 16 does not constitute the limitation to the terminal 500, more or fewer assemblies may be included as compared with FIG. 16, some assemblies may be combined, or different assemblies may be adopted for arrangement.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium has at least one instruction, at least one program, a code set or an instruction set, the at least one instruction, the at least one program, the code set or the instruction set being loaded and executed by the processor to implement the method for perspective rotation in any one of FIG. 4 to FIG. 16.

In some embodiments, the computer-readable storage medium may include: a ROM, a RAM, a solid state drive (SSD), an optical disc, or the like. The RAM may include a resistance random access memory (ReRAM) and a dynamic random access memory (DRAM). The sequence numbers of the foregoing embodiments of this application are merely for description purpose but do not imply the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a ROM, a magnetic disc, an optical disc, or the like.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A method for perspective rotation in a virtual environment performed at a terminal, the method comprising:
    displaying (i) a first perspective image of an application program associated with the virtual environment, (ii) a first function control for supporting a first function and a perspective rotation function, and (iii) a second function control for supporting a second function and the same perspective rotation function, wherein the first perspective image is an image of the virtual environment observed using a first perspective direction of a virtual character in the virtual environment and the first function control and the second function control are overlaid on the first perspective image;
    receiving a first perspective rotation operation triggered based on the first function control;
    enabling the first function and the perspective rotation function of the first function control and switching the first perspective image to a second perspective image according to the first perspective rotation operation, the second perspective image being an image of the virtual environment observed using a second perspective direction of the virtual character in the virtual environment;
    receiving a second perspective rotation operation triggered based on the second function control while the first function control is in an enabled state;
    disabling the perspective rotation function of the first function control, enabling the second function and the perspective rotation function of the second function control, and switching the second perspective image to a third perspective image according to the second perspective rotation operation, the third perspective image being an image of the virtual environment observed using a third perspective direction of the virtual character in the virtual environment.

2. The method according to claim 1, wherein the disabling the perspective rotation function of the first function control, enabling the second function and the perspective rotation function of the second function control, and switching the second perspective image to a third perspective image according to the second perspective rotation operation comprises:
    generating a second sequential number of the second function control according to the second perspective rotation operation; and
    when the second sequential number is greater than a first sequential number, disabling the perspective rotation function of the first function control and enabling the second function and the perspective rotation function of the second function control, the first sequential number being a sequential number of the first function control.

3. The method according to claim 2, wherein the first function control comprises first function controls in an enabled state, and the first function controls in the enabled state each correspond to a first sequential number; and
    the generating a second sequential number of the second function control according to the second perspective rotation operation comprises:
        obtaining a maximum sequential number from the first sequential numbers according to the second perspective rotation operation; and
        increasing the maximum sequential number by one to obtain the second sequential number.

4. The method according to claim 2, wherein the first function control comprises first function controls in an enabled state, and the method further comprises:
    after disabling the perspective rotation function of the first function control and enabling the second function and the perspective rotation function of the second function control,
    when the second perspective rotation operation based on the second function control ends, determining an $i^{th}$ first function control in the enabled state from the first function controls in the enabled state, and enabling the perspective rotation function of the $i^{th}$ first function control in the enabled state, i being a positive integer.

5. The method according to claim 4, wherein the first function controls in the enabled state each correspond to a first sequential number; and
    the determining an $i^{th}$ first function control in the enabled state from the first function controls in the enabled state, and enabling the perspective rotation function of the $i^{th}$ first function control in the enabled state comprises:
        when the first sequential number of the $i^{th}$ first function control in the enabled state is a maximum sequential number, enabling the perspective rotation function of the $i^{th}$ function control in the enabled state.

6. The method according to claim 1, further comprising:
    displaying a setting interface of the application program, the setting interface comprising at least two mode setting controls, and the mode setting controls being configured to set a mode for triggering a perspective rotation operation;
    receiving a selection operation triggered on the setting interface, the selection operation being used for selecting a mode setting control corresponding to a target trigger mode in at least two of the mode setting controls; and
    determining the mode for triggering the perspective rotation operation as the target trigger mode according to the selection operation, the perspective rotation operation comprising any one of the first perspective rotation operation and the second perspective rotation operation.

7. The method according to claim 6, wherein:
    the perspective rotation operation comprises a second perspective rotation operation;
    the target trigger mode comprises a tap operation; and the enabling the second function of the second function control according to the second perspective rotation operation comprises enabling the second function of the second function control according to the tap operation; and
the method further comprises:
when the tap operation ends, keeping the second function of the second function control in the enabled state.

8. The method according to claim 6, wherein:
the perspective rotation operation comprises the second perspective rotation operation;
the target trigger mode comprises a long press operation;
the enabling the second function of the second function control according to the second perspective rotation operation comprises enabling the second function of the second function control according to the long press operation; and
the method further comprises:
when the long press operation ends, keeping the second function of the second function control in the enabled state.

9. The method according to claim 6, wherein:
the perspective rotation operation comprises the second perspective rotation operation;
the target trigger mode comprises a touch operation;
the enabling the second function of the second function control according to the second perspective rotation operation comprises enabling the second function of the second function control according to the touch operation; and
the method further comprises:
when the touch operation ends, obtaining a duration of the touch operation; and
when the duration is greater than a time threshold, keeping the second function of the second function control in the enabled state.

10. The method according to claim 9, further comprising:
when the duration is less than or equal to the time threshold, disabling the second function of the second function control.

11. The method according to claim 1, further comprising:
controlling a perspective rotation of the virtual character by the first function control according to a customized logic;
or,
controlling the perspective rotation of the virtual character by the second function control according to the customized logic;
the customized logic being a user-customized logic responsive to a perspective rotation operation when the first function control and the second function control are triggered.

12. A terminal, comprising:
a memory; and
a processor connected to the memory;
the processor being configured to load and execute executable instructions for perspective rotation in a virtual environment by performing a plurality of operations including:
displaying (i) a first perspective image of an application program associated with the virtual environment, (ii) a first function control for supporting a first function and a perspective rotation function, and (iii) a second function control for supporting a second function and the same perspective rotation function, wherein the first perspective image is an image of the virtual environment observed using a first perspective direction of a virtual character in the virtual environment and the first function control and the second function control are overlaid on the first perspective image;
receiving a first perspective rotation operation triggered based on the first function control;
enabling the first function and the perspective rotation function of the first function control and switching the first perspective image to a second perspective image according to the first perspective rotation operation, the second perspective image being an image of the virtual environment observed using a second perspective direction of the virtual character in the virtual environment;
receiving a second perspective rotation operation triggered based on the second function control while the first function control is in an enabled state; and
disabling the perspective rotation function of the first function control, enabling the second function and the perspective rotation function of the second function control, and switching the second perspective image to a third perspective image according to the second perspective rotation operation, the third perspective image being an image of the virtual environment observed using a third perspective direction of the virtual character in the virtual environment.

13. The terminal according to claim 12, wherein the disabling the perspective rotation function of the first function control, enabling the second function and the perspective rotation function of the second function control, and switching the second perspective image to a third perspective image according to the second perspective rotation operation comprises:
generating a second sequential number of the second function control according to the second perspective rotation operation; and
when the second sequential number is greater than a first sequential number, disabling the perspective rotation function of the first function control and enabling the second function and the perspective rotation function of the second function control, the first sequential number being a sequential number of the first function control.

14. The terminal according to claim 13, wherein the first function control comprises first function controls in an enabled state, and the first function controls in the enabled state each correspond to a first sequential number; and
the generating a second sequential number of the second function control according to the second perspective rotation operation comprises:
obtaining a maximum sequential number from the first sequential numbers according to the second perspective rotation operation; and
increasing the maximum sequential number by one to obtain the second sequential number.

15. The terminal according to claim 13, wherein the first function control comprises first function controls in an enabled state, and the plurality of operations further comprise:
after disabling the perspective rotation function of the first function control and enabling the second function and the perspective rotation function of the second function control,
when the second perspective rotation operation based on the second function control ends, determining an $i^{th}$ first function control in the enabled state from the first function controls in the enabled state, and enabling the perspective rotation function of the $i^{th}$ first function control in the enabled state, i being a positive integer.

16. The terminal according to claim 12, wherein the plurality of operations further comprise:
displaying a setting interface of the application program, the setting interface comprising at least two mode setting controls, and the mode setting controls being configured to set a mode for triggering a perspective rotation operation;
receiving a selection operation triggered on the setting interface, the selection operation being used for selecting a mode setting control corresponding to a target trigger mode in at least two of the mode setting controls; and
determining the mode for triggering the perspective rotation operation as the target trigger mode according to the selection operation, the perspective rotation operation comprising any one of the first perspective rotation operation and the second perspective rotation operation.

17. A non-transitory computer-readable storage medium having at least one instruction for perspective rotation in a virtual environment stored therein, the at least one instruction being loaded and executed by a processor of a terminal to perform a plurality of operations including:
displaying (i) a first perspective image of an application program associated with the virtual environment, (ii) a first function control for supporting a first function and a perspective rotation function, and (iii) a second function control for supporting a second function and the same perspective rotation function, wherein the first perspective image is an image of the virtual environment observed using a first perspective direction of a virtual character in the virtual environment and the first function control and the second function control are overlaid on the first perspective image;
receiving a first perspective rotation operation triggered based on the first function control;
enabling the first function and the perspective rotation function of the first function control and switching the first perspective image to a second perspective image according to the first perspective rotation operation, the second perspective image being an image of the virtual environment observed using a second perspective direction of the virtual character in the virtual environment;
receiving a second perspective rotation operation triggered based on the second function control while the first function control is in an enabled state; and
disabling the perspective rotation function of the first function control, enabling the second function and the perspective rotation function of the second function control, and switching the second perspective image to a third perspective image according to the second perspective rotation operation, the third perspective image being an image of the virtual environment observed using a third perspective direction of the virtual character in the virtual environment.

18. The non-transitory computer-readable storage medium according to claim 17, wherein the disabling the perspective rotation function of the first function control, enabling the second function and the perspective rotation function of the second function control, and switching the second perspective image to a third perspective image according to the second perspective rotation operation comprises:
generating a second sequential number of the second function control according to the second perspective rotation operation; and
when the second sequential number is greater than a first sequential number, disabling the perspective rotation function of the first function control and enabling the second function and the perspective rotation function of the second function control, the first sequential number being a sequential number of the first function control.

19. The non-transitory computer-readable storage medium according to claim 18, wherein the first function control comprises first function controls in an enabled state, and the first function controls in the enabled state each correspond to a first sequential number; and
the generating a second sequential number of the second function control according to the second perspective rotation operation comprises:
obtaining a maximum sequential number from the first sequential numbers according to the second perspective rotation operation; and
increasing the maximum sequential number by one to obtain the second sequential number.

20. The non-transitory computer-readable storage medium according to claim 18, wherein the first function control comprises first function controls in an enabled state, and the plurality of operations further comprise:
after disabling the perspective rotation function of the first function control and enabling the second function and the perspective rotation function of the second function control,
when the second perspective rotation operation based on the second function control ends, determining an $i^{th}$ first function control in the enabled state from the first function controls in the enabled state, and enabling the perspective rotation function of the $i^{th}$ first function control in the enabled state, i being a positive integer.

\* \* \* \* \*